(12) United States Patent
Inbe et al.

(10) Patent No.: US 8,980,078 B2
(45) Date of Patent: Mar. 17, 2015

(54) ELECTRODEPOSITION COATING COMPOSITION

(75) Inventors: Toshio Inbe, Osaka (JP); Yohei Yoshimi, Osaka (JP); Ryuji Ishikawa, Osaka (JP)

(73) Assignee: Nippon Paint Co., Ltd., Osaka (JP)

(*) Notice: Subject to any disclaimer, the term of this patent is extended or adjusted under 35 U.S.C. 154(b) by 0 days.

(21) Appl. No.: 14/343,141

(22) PCT Filed: Sep. 6, 2012

(86) PCT No.: PCT/JP2012/072682
§ 371 (c)(1),
(2), (4) Date: Mar. 6, 2014

(87) PCT Pub. No.: WO2013/035765
PCT Pub. Date: Mar. 14, 2013

(65) Prior Publication Data
US 2014/0197039 A1   Jul. 17, 2014

(30) Foreign Application Priority Data

Sep. 7, 2011 (JP) ................................ 2011-194864
Sep. 4, 2012 (JP) ................................ 2012-194345

(51) Int. Cl.
| | |
|---|---|
| *C25D 9/02* | (2006.01) |
| *C09D 5/44* | (2006.01) |
| *C25D 13/22* | (2006.01) |
| *C25D 13/20* | (2006.01) |

(52) U.S. Cl.
CPC .. *C25D 9/02* (2013.01); *C09D 5/44* (2013.01); *C25D 13/22* (2013.01); *C25D 13/20* (2013.01)
USPC ........................................................ 205/317

(58) Field of Classification Search
CPC ........................................................ C25D 9/02
USPC ........................................................ 205/317
See application file for complete search history.

(56) References Cited

U.S. PATENT DOCUMENTS

| | | | |
|---|---|---|---|
| 5,330,839 A |  | 7/1994 | Yasuoka et al. |
| 7,005,051 B2* |  | 2/2006 | Kojima et al. ............ 204/488 |
| 2005/0234149 A1 |  | 10/2005 | Grosse-Brinkhaus et al. |
| 2009/0101512 A1 |  | 4/2009 | Kubota |
| 2009/0266714 A1* |  | 10/2009 | Kaneko et al. ............ 205/50 |
| 2011/0062026 A1* |  | 3/2011 | Nishiguchi et al. ........ 205/50 |

FOREIGN PATENT DOCUMENTS

| | | |
|---|---|---|
| JP | 5-65439 | 3/1993 |
| JP | 2000-336287 | 12/2000 |
| JP | 2002-294141 | 10/2002 |
| JP | 2005-194389 | 7/2005 |
| JP | 2005-534796 | 11/2005 |
| JP | 2008-115451 | 5/2008 |
| JP | 2008-196043 | 8/2008 |
| JP | 2009-149974 | 7/2009 |
| JP | 2010-214283 | 9/2010 |
| JP | 2011-84729 | 4/2011 |

OTHER PUBLICATIONS

English translation of the International Preliminary Report on Patentability and Written Opinion in PCT/JP2012/072682 dated Mar. 12, 2014.
International Search Report issued Nov. 13, 2012 in International (PCT) Application No. PCT/JP2012/072682.

* cited by examiner

*Primary Examiner* — Bryan D. Ripa
(74) *Attorney, Agent, or Firm* — Wenderoth, Lind & Ponack, L.L.P.

(57) ABSTRACT

According to the present invention, provided is an electrodeposition coating composition, which can form an electrodeposition coating film having excellent corrosion resistance and coating film smoothness.

The present invention relates to an electrodeposition coating composition comprising a soluble metal compound (A), amine-modified resin (B) and curing agent (C), wherein the resin (B) has an average molecular weight of 1,000 to 5,000, an amine value of 20 to 100 mgKOH/g and a hydroxyl value of 50 to 400 mgKOH/g, a theoretical residual hydroxyl value when the resin (B) and curing agent are reacted in an electrodeposition coating film is from 30 to 350 mgKOH/g, and the ratio (R) of the concentration of the theoretical residual hydroxyl value to the concentration of the compound (A) in the composition, based on the total of the solid content of the resin (B) and the curing agent in the composition satisfies the relationship (4,000<R<400,000).

9 Claims, No Drawings

US 8,980,078 B2

ELECTRODEPOSITION COATING COMPOSITION

TECHNICAL FIELD

The present invention relates to an electrodeposition coating composition, which can form a cured electrodeposition coating film having excellent corrosion resistance.

BACKGROUND OF THE INVENTION

Electrodeposition coating is widely put into practical use as a method for undercoating an article to be coated having a large and complex shape, particularly automobile body, because it is possible to automatically and continuously apply a coating into the details of an article to be coated having a complex shape. As the electrodeposition coating, cationic electrodeposition coating has been widely used. Cationic electrodeposition coating is a coating method, which is carried out by immersing the article to be coated as a cathode material in the cationic electrodeposition coating composition and applying a voltage.

In many cases, a chemical conversion treatment such as zinc phosphate-based chemical conversion treatment is conducted for the article to be coated before the cationic electrodeposition coating. By the chemical conversion treatment, it is possible to improve the corrosion resistance and adhesion. However, since a chemical conversion treatment composition used for the zinc phosphate-based chemical conversion treatment is not desirable from the viewpoint of economy and workability, such as high cost for the waste water treatment, because it has high metal ion concentration and very high reactivity. Further, in the chemical conversion treatment by a zinc phosphate-based chemical conversion treatment composition, salts insoluble in water are produced in accordance with the surface treatment of metal, it is deposited as a precipitate in the inside of the chemical conversion treatment tank. Such the precipitate is called as sludge in general, it has been a problem to increase costs for the removal and disposal of the sludge. In addition, it is in danger of giving the load on the environment, such as the eutrophication of rivers and ocean by the phosphate ion. Moreover, since in surface treatment by the zinc phosphate-based chemical conversion treatment composition, it is necessary to perform surface conditioning before the treatment, there has been a problem of the production efficiency that the step of surface treatment is complicated and long.

Method using zirconium-based chemical conversion treatment composition instead of the zinc phosphate-based chemical conversion treatment composition is investigated. However, since the thickness of the chemical conversion coating film formed by the zirconium-based chemical conversion treatment composition is thinner than that of the chemical conversion coating formed by the zinc phosphate-based chemical conversion treatment composition, it is often that the performance such as corrosion resistance, adhesion is poor. On the other hand, there is a problem that the coating film appearance is poor when increasing the thickness of the electrodeposition coating film in order to compensate the corrosion resistance of the zirconium-based chemical conversion coating. Therefore, it is required to develop the electrodeposition coating composition, which can form a cured electrodeposition coating film having excellent corrosion resistance, excellent adhesion and good coating film appearance, in order to compensate the corrosion resistance of the chemical conversion coating formed by the zirconium-based chemical conversion treatment composition.

A coating film forming agent comprising a zirconium compound and optionally a metal compound (A) of at least one metal (a) selected from the group consisting of titanium, cobalt, vanadium, tungsten, molybdenum, zinc, aluminum, bismuth, yttrium, lanthanide metals, alkali metal and alkaline earth metal on the total metal content (in mass basis) of 30 to 5,000 ppm; 1 to 40% by mass of a resin component (B); 0.1 to 10% by mass of a surfactant (C) and water, based on the total weight of the coating film forming agent, is disclosed in Japanese Patent Kokai Publication No. 115451/2008. However, the coating film forming agent is different from the electrodeposition coating composition of the present invention in the configuration of the invention that the surfactant (C) is included.

A method of forming a multiple layered coating film comprising:

Step 1: immersing a metal substrate in chemical conversion treatment liquid as a coating film forming agent (1) to form a chemical conversion coating film (F1); and Step 2: without washing with water, electrodeposition coating a metal substrate using a coating film forming agent (2) as a cationic electrodeposition coating (I) to form an electrodeposition coating film (F2);

wherein the coating film forming agent (1) contains at least one metal compound component (M) comprising a compound of at least one metal (m) selected from the group consisting of zirconium, titanium, cobalt, vanadium, tungsten, molybdenum, copper, zinc, indium, bismuth, yttrium, iron, nickel, manganese, gallium, silver and lanthanide metal, is disclosed in Japanese Patent Kokai Publication No. 149974/2009. However, the multiple layered coating film is different from the electrodeposition coating composition of the present invention in the configuration of the invention that the coating film forming agent (1) containing at least one metal compound component (M) is different from the coating film forming agent (2) as the cationic electrodeposition coating.

SUMMARY OF THE INVENTION

The present invention is intended to solve the conventional problems described above, and a main object of the present invention is to provide an electrodeposition coating composition, which can form a coating film having excellent corrosion resistance and excellent coating film appearance (coating film smoothness).

The present invention provides an electrodeposition coating composition comprising a soluble metal compound (A) containing at least one metal selected from the group consisting of Ti, Bi, Zn, Y, Nd, La and Zr, an amine-modified resin (B) and a curing agent (C), wherein the amine-modified resin (B) has a number average molecular weight of 1,000 to 5,000, an amine value of 20 to 100 mgKOH/g and a hydroxyl value of 50 to 400 mgKOH/g, the curing agent (C) is a blocked isocyanate curing agent, a theoretical residual hydroxyl value when the amine-modified resin (B) and the blocked isocyanate curing agent are reacted in an electrodeposition coating film during thermal curing is within the range of 20 to 350 mgKOH/g, and a ratio represented by the following formula:

$$R = \frac{(TH)}{[(A)/(B+C)]}$$

wherein TH is theoretical residual hydroxyl value [mgKOH/g] and the [(A)/(B+C)] is the concentration in metal element conversion of the soluble metal compound (A) in the electrodeposition coating composition [% by mass], based on the total of a solid concentration [% by mass] of the amine-modified resin (B) and a solid concentration [% by mass] of the blocked isocyanate curing agent in the electrodeposition coating composition,
is greater than 4,000 and smaller than 400,000 ($4,000<R<400,000$), and the above problems can be solved thereby.

It is desired that the electrodeposition coating composition further comprises nitric acid or a metal salt of nitrous acid (D).

It is desired that the electrodeposition coating composition further comprises a plasticizer.

It is desired that the electrodeposition coating composition further comprises at least one chelating acid (E) selected from the group consisting of sulfonic acid, organic phosphonic acid, organic carboxylic acid, amino acid, aminocarboxylic acid, sugar acid and carboxyl group-containing vinyl resin.

It is desired that the electrodeposition coating composition further comprises an aminosilane compound (F).

It is desired that the soluble metal compound (A) is a zinc compound, and the zinc compound is a zinc phosphate having a volume average particle diameter D50 of not more than 3 μm dispersed with a cationic dispersant and the cationic dispersant is an aminosilane compound.

It is desired that the electrodeposition coating composition further comprises an aluminum complex (G).

It is desired that:
the soluble metal compound (A) has a solid content of 0.001 to 1% by mass in metal element conversion, based on the electrodeposition coating composition,
the nitric acid or the metal salt of nitrous acid (D) has a content of 0.001 to 1% by mass, based on the electrodeposition coating composition, and
the electrodeposition coating composition has a resin solid content of 1 to 30% by mass.

The present invention also provides a process for forming an electrodeposition coating film on an article to be coated having a Zr-based chemical conversion coating film comprising the steps of:
electrodeposition coating the electrodeposition coating composition on an article to be coated having a chemical conversion coating film formed by a Zr-based chemical conversion composition to form an electrodeposition coating film, and
thermally curing the electrodeposition coating film to form a cured electrodeposition coating film.

It is possible to obtain good corrosion resistance and good adhesion by using the electrodeposition coating composition of the present invention even if carrying out electrodeposition coating for the article to be coated having zirconium-based chemical conversion coating film, which is thinner than the zinc phosphate-based chemical conversion coating film. Furthermore, there is also an advantage that the coating film formed by using the electrodeposition coating composition of the present invention has high coating film smoothness. By using the electrodeposition coating composition of the present invention, the steel sheet, on which zirconium-based chemical conversion treatment is carried out, can be effectively utilized, and it is accomplished to reduce costs and labor necessary for operation and maintenance due to the zinc phosphate-based chemical conversion treatment.

In addition, when performing the chemical conversion treatment of the type such that the coating film is grown from a crystal nucleus as a base point, such as the zinc phosphate-based chemical conversion treatment, the chemical conversion coating film is difficult to form sufficiently at the edge portion of an article to be coated, and there is a problem that the corrosion easily starts from the portion. However, according to the present invention, it is possible to improve the coverage at the edge portion, which the chemical conversion coating film is not sufficiently formed, and sufficient rust resistance can be accomplished.

In the present invention, when specific metal species (concretely Ti, Bi, Zn, Y, Nd, La and Zr) are incorporated into the electrodeposition coating and then a voltage is applied to the electrodeposition bath, the metal is previously deposited on the article to be coated only about five seconds before the resin is deposited thereon. In the present invention, the rust resistance is remarkably improved by using the soluble metal compound (A) containing the metal and adjusting the functional group content in the coating film forming resin and the metal content in the soluble metal compound (A) to a predetermined range. In addition, the edge portion can be sufficiently coated with the electrodeposition coating film by using the electrodeposition coating composition of the present invention, and it is possible to effectively prevent edge corrosion. Examples of coating pretreatment of the article to be treated, which can such effects, are not particularly limited, but include, for example, zinc phosphate treatment, iron phosphate treatment, zirconium treatment, and degreasing treatment.

DETAILED DESCRIPTION OF THE PREFERRED EMBODIMENTS

Electrodeposition Coating Composition

The electrodeposition coating composition of the present invention comprises a soluble metal compound (A) containing at least one metal selected from the group consisting of Ti, Bi, Zn, Y, Nd, La and Zr, an amine-modified resin (B) and a curing agent (C). Below, each component will be explained in detail.

Soluble Metal Compound (A)

The electrodeposition coating composition of the present invention comprises a soluble metal compound (A) containing at least one metal selected from the group consisting of Ti, Bi, Zn, Y, Nd, La and Zr. As used herein, the soluble metal compound (A) means a compound such that not less than 0.1% by mass in metal conversion thereof is dissolved in 20° C. water, which is adjusted to pH4 with nitric acid. In the electrodeposition coating composition of the present invention, the soluble metal compound (A) having the above property is present in the state such that the whole thereof is dissolved in the electrodeposition coating composition, or one portion thereof is dissolved and the rest is dispersed in the electrodeposition coating composition. As used herein, the "dissolved" refers to the state that is uniformly dissolved in a solvent and the state that is finely dispersed in a solvent. Concretely, it refers to the state that is not precipitated after it is centrifuged for 30 minutes at 12000 rpm. If the soluble metal compound (A) is present in the state that one portion thereof is not dissolved and is dispersed in the electrodeposition coating composition of the present invention, it is preferable that it has a volume average particle diameter D50 of not more than 3 μm. As used herein, the volume average particle diameter D50 may be measured, for example, using a particle size measuring device, such as dynamic light scattering particle size analyzer ("Nanotrac UPA150" manufactured by Nikkiso Co., Ltd.). The cured electrodeposition coating film having excellent corrosion resistance is obtained by containing the soluble metal compound (A) in the electrodeposition coating composition of the present invention. The soluble metal compound (A) imparts adhesion to the electrodeposition coating film by forming a metal layer on the substrate surface in preference to the electrodeposition coating film in the initial stage of electrodeposition coating step. At the same time, the soluble metal compound (A) improves the barrier property of the electrodeposition coating film by improving the crosslinking density and glass transition temperature (Tg) of the coating film, because the soluble metal compound (A) is incorporated also into the electrodeposition coating film and functions as an inorganic crosslinking agent during the baking thereof. Therefore, the cured electrodeposition coating film having excellent corrosion resistance is obtained.

Examples of the metal compounds when the metal contained in the soluble metal compound (A) is Ti include, for example, fluorotitanic acid ($H_2TiF_6$), ammonium fluorotitanate, titanium sulphate and the like. The preferred metal compound when the metal contained in the soluble metal compound (A) is Ti is fluorotitanic acid.

In addition, in the soluble metal compound (A) of the present invention, it is not intended that the metal compound containing Ti includes pigment components commonly used in white pigments such as titanium dioxide. This is because the pigment components such as titanium dioxide is not in the state that the whole thereof is dissolved in the electrodeposition coating composition, and it is not fulfilled that not less than 0.1% by mass in metal conversion thereof is dissolved in 20° C. water, which is adjusted to pH4 with nitric acid.

Examples of the metal compounds when the metal contained in the soluble metal compound (A) is Bi include, for example, bismuth salts of organic acids, which is formed by previously mixing bismuth oxide or bismuth hydroxide with an organic acid such as lactic acid, methanesulfonic acid, DMPA (dimethyl propionic acid), gluconic acid. The preferred soluble metal compounds when the metal contained in the soluble metal compound (A) is Bi are bismuth lactate and bismuth salt of DMPA.

In addition, in the soluble metal compound (A) of the present invention, it is not intended that lactic acid and DMPA, which are constituent components of bismuth lactate or bismuth salt of DMPA as examples of bismuth compounds, are included in the (E) chelating acid described below. This is because the lactic acid and DMPA, which are constituent components of the bismuth compounds, are present as a counter anion of bismuth, and they have no chelating ability to be required in the chelating acid.

Examples of the metal compounds when the metal contained in the soluble metal compound (A) is Zn include, for example, zinc compounds such as zinc oxide, zinc hydroxide, zinc acetate, zinc lactate, zinc nitrate, zinc methanesulfonate, zinc formate, zinc phosphate and the like. The soluble metal compound when the metal contained in the soluble metal compound (A) is Zn, is preferably zinc oxide or zinc phosphate, and more preferably zinc phosphate having a volume average particle diameter D50 of not more than 3 µm, which is dispersed with a cationic dispersing agent. In addition, examples of the cationic agents which can be used for the dispersing of the zinc compounds include, for example, dispersion resins having a cationic group such as modified epoxy resins having at least one member selected from the group consisting of quaternary ammonium groups, tertiary sulfonium groups and primary amine groups; the aminosilane compound (F); and the like. In addition, it is preferable that the zinc compound (such as zinc phosphate) dispersed with the cationic dispersing agent has a volume average particle diameter D50 of not less than 0.05 µm, because of good stability of the pigment-dispersed paste.

Examples of the metal compounds when the metal contained in the soluble metal compound (A) is Zr include, for example, fluorozirconic acid; salts of fluorozirconic acid such as potassium fluorozirconate, ammonium fluorozirconate; zirconium fluoride; zirconium oxide; zirconium nitrate; zirconium carbonate; zirconyl nitrate; zirconyl sulfate; zirconyl carbonate; zirconyl acetate and the like. The preferred soluble metal compounds when the metal contained in the soluble metal compound (A) is Zr are fluorozirconic acid and zirconyl nitrate.

Examples of the metal compounds when the metals contained in the soluble metal compound (A) are Y, Nd and La include, for example, oxide salts, hydroxide salts, acetates, lactates and nitrates of Y, Nd and La and the like. The preferred soluble metal compounds of Y, Nd and La are nitrates and methanesulfonate and sulfamate, which metal oxides of Y, Nd and La are dissolved with an acid.

It is desired that the soluble metal compound (A) in the electrodeposition coating composition of the present invention has a solid content of 0.001 to 1% by mass in metal element conversion. As used herein, the "metal element conversion" means that the metal element amount is determined by multiplying the content of the soluble metal compound (A) by a metal element conversion factor (which is a factor for converting the metal compound amount into the metal element amount, concretely which means the value obtained by dividing the atomic weight of the metal element in the metal compound by the molecular weight of the metal compound). For example, if the soluble metal compound (A) is a fluorozirconate ion, the metal element conversion content of zirconium of the complex ion $ZrF_6^{2-}$ (molecular weight 205) 0.01% by mass was determined as 0.0044% by mass by the calculation of (0.01% by mass)×(91/205). By solids content of soluble metal compound (A) is 0.001 mass % or more in terms of metal elements, it is possible to impart good corrosion resistance to the article to be coated by adjusting the solid content of the soluble metal compound (A) to not less than 0.001% by mass in metal element conversion. In addition, it is possible to inhibit the aggregation with the amine-modified resin by adjusting the solid content of the soluble metal compound (A) to not more than 1% by mass in metal element conversion, and the stability, corrosion resistance and coating property are ensured. The solid content of the soluble metal compound (A) is more preferably within the range of 0.005 to 0.5% by mass in metal element conversion.

In the electrodeposition coating composition, an organotin curing catalyst such as dibutyl tin dilaurate, dioctyl tin oxide is generally used as a curing catalyst. Recently, the toxicity of the organotin compound is viewed as a problem and the restriction on use thereof is discussed, and thus it is preferable to contain no organotin curing catalyst in the electrodeposition coating composition of the present invention. The electrodeposition coating composition of the present invention has excellent thermal curability by containing the soluble metal compound (A) therein even if the organotin curing catalyst is not contained in the electrodeposition coating composition.

Amine-Modified Resin (B)

The electrodeposition coating composition of the present invention contains an amine-modified resin (B). The amine-modified resin (B) is a coating film forming resin, which is a constituent component of the electrodeposition coating film. The preferred amine-modified resin (B) is a cation-modified epoxy resin formed by modifying an oxirane ring in the resin backbone with an organic amine compound. The cation-modified epoxy resin is generally prepared by the ring-opening of an oxirane ring in the starting material resin molecule by the reaction with amines such as primary amine, secondary amine or tertiary amine and/or the acid salts thereof. Typical examples of the starting material resins include a polyphenol polyglycidyl ether type epoxy resin, which is a reaction product of epichlorohydrin and polycyclic phenolic compounds, such as bisphenol A, bisphenol F, bisphenol S, phenol novolac and cresol novolac. In addition, other examples of the starting material resins include the oxazolidone ring-containing epoxy resin described in Japanese Patent Kokai Publication No. 306327/1994. These epoxy resins, may be prepared by the reaction of a diisocyanate compound, or a bis-urethane compound obtained by blocking the isocyanate groups of the diisocyanate compound with a lower alcohol such as methanol, ethanol and the like with epichlorohydrin.

The starting material resin can be chain extended with bifunctional polyester polyol, polyether polyol, bisphenol, dibasic carboxylic acid and the like before the ring-opening reaction of the oxirane ring by amines.

Similarly, it can also be used by adding monohydroxy compounds, such as 2-ethylhexanol, nonylphenol, ethylene glycol mono-2-ethylhexyl ether, ethylene glycol mono-n-butyl ether, propylene glycol mono-2-ethylhexyl ether to a part of the oxirane rings for the purpose of adjustment of the molecular weight or amine equivalent weight, and improvement of heat flow property before the ring-opening reaction of the oxirane ring by amines, before the ring-opening reaction of the oxirane ring by amines.

Examples of the amines, which may be used when ring-opening the oxirane ring to introduce an amino group, include primary amines, secondary amines or tertiary amines, such as butylamine, octylamine, diethylamine, dibutylamine, methylbutylamine, monoethanolamine, diethanolamine, N-methyl ethanolamine, triethylamine, N,N-dimethyl benzylamine, N,N-dimethyl ethanolamine, and/or the acid salts thereof. In addition, diethylenetriamine diketimine and ketimine-blocked primary amino group-containing secondary amines, such as amino ethyl ethanolamine methyl isobutyl ketimine, can be also used. It is necessary to conduct the reaction of at least equivalent amount of the amines with the oxirane rings in order to accomplish the ring-opening of the all oxirane rings.

It is desired that the amine-modified resin (B) has a number average molecular weight of 1,000 to 5,000. It is possible to improve physical properties, such as solvent resistance and corrosion resistance, of the cured electrodeposition coating film obtained by adjusting the number average molecular weight thereof to not less than 1,000. On the other hand, the viscosity of the amine-modified resin can be easily adjusted and thereby it can be smoothly synthesized; and it is possible to improve the handling ability of the emulsification and dispersion of the amine-modified resin (B) obtained by adjusting the number average molecular weight thereof to not more than 5,000. The number average molecular weight of the amine-modified resin (B) is more preferably within the range of 1,600 to 32,000.

In the present specification, the number average molecular weight is the number average molecular weight in polystyrene conversion measured by gel permeation chromatography (GPC).

It is desired that the amine-modified resin (B) has an amine value of 20 to 100 mgKOH/g. It is possible to improve the stability of the emulsification and dispersion of the amine-modified resin (B) in the electrodeposition coating composition by adjusting the amine value of the amine-modified resin (B) to not less than 20 mgKOH/g. On the other hand, it is possible to obtain a proper amount of the amino groups in the cured electrodeposition coating film and to avoid reducing the water resistance of the coating film by adjusting the amine value of the amine-modified resin (B) to not more than 100 mgKOH/g. The amine value of the amine-modified resin (B) is more preferably within the range of 20 to 80 mgKOH/g.

It is desired that the amine-modified resins (B) has a hydroxyl value of 50 to 400 mgKOH/g. It is possible to improve the curability of the cured electrodeposition coating film by adjusting the hydroxyl value to not less than 50 mgKOH/g. On the other hand, it is possible to obtain a proper amount of the residual hydroxyl groups in the cured electrodeposition coating film and to avoid reducing the water resistance of the coating film by adjusting the hydroxyl value to not more than 400 mgKOH/g. The hydroxyl value of the amine-modified resin (B) is more preferably within the range of from 100 to 300 mgKOH/g.

In the electrodeposition coating composition of the present invention, there is an advantage that it is possible to impart good corrosion resistance to the article to be coated by using the amine-modified resin (B) having a number average molecular weight of from 1,000 to 5,000, an amine value of from 20 to 100 mgKOH/g and a hydroxyl value of 50 to 400 mgKOH/g.

The amine-modified resin (B), if necessary, may be used in combination with amine-modified resins having different hydroxyl value and/or amine value. For example, the mixture of the amine-modified resin having an amine value of from 20 to 50 mgKOH/g and a hydroxyl value of 50 to 300 mgKOH/g with the amine-modified resin having an amine value of from 50 to 200 mgKOH/g and a hydroxyl value of 200 to 500 mgKOH/g may be used. There is an advantage that it is possible to impart excellent corrosion resistance to the electrodeposition coating film, because the core portion of the emulsion becomes more hydrophobic and the shell portion thereof becomes more hydrophilic by using the combination of amine-modified resins.

When using two or more amine-modified resins having different amine value and hydroxyl value, the average amine value and the average hydroxyl value are calculated, based on the weight ratio of amine-modified resins used, and the ratio (R) can be calculated by using these average values.

In addition, the amine-modified resin (B), if necessary, may include an amino group-containing acrylic resin, an amino group-containing polyester resin and the like.

Curing Agent (C)

In the electrodeposition coating composition of the present invention, a blocked isocyanate curing agent is used as the curing agent (C) in order to accomplish excellent stability and coating performance. As the curing agent for the electrodeposition coating composition, the combination of the curing agent (C) and at least one curing agent selected from the group consisting of organic curing agents such as melamine resin and phenol resin, a silane coupling agent and a metal curing agent may be used. The blocked isocyanate curing agent can be prepared by blocking polyisocyanate with a blocking agent.

Examples of the polyisocyanates include aliphatic diisocyanates such as hexamethylene diisocyanate (including a trimer), tetramethylene diisocyanate and trimethylhexamethylene diisocyanate; alicyclic polyisocyanates such as isophorone diisocyanate, 4,4'-methylenebis(cyclohexyl isocyanate); and aromatic diisocyanates such as 4,4'-diphenylmethane diisocyanate, tolylene diisocyanate, xylylene diisocyanate, and the like.

Examples of the blocking agents suitably used include monovalent alkyl (or aromatic) alcohols such as n-butanol, n-hexyl alcohol, 2-ethylhexanol, lauryl alcohol, phenol carbinol, methyl phenyl carbinol; cellosolves such as ethylene glycol monohexyl ether, ethylene glycol mono 2-ethylhexyl ether; both terminal-type polyether diols such as polyethylene glycol, polypropylene glycol, and polytetramethylene ether glycol phenol; both terminal-type polyester diols formed from diols such as ethylene glycol, propylene glycol, 1,4-butanediol and dicarboxylic acids such oxalic acid, succinic acid, adipic acid, suberic acid, sebacic acid; phenols such as para-t-butylphenol, cresol; oximes such as dimethyl ketoxime, methyl ethyl ketoxime, methyl isobutyl ketoxime, methyl amyl ketoxime and cyclohexanone oxime; and lactams represented by ε-caprolactam and γ-butyrolactam.

It is preferable that the blocked isocyanate curing agent has a blocking ratio of 100%. Thereby there is an advantage that it is possible to improve the storage stability of the electrodeposition coating composition.

If the curing agent (C) is the blocked isocyanate curing agent in the electrodeposition coating composition of the present invention, it is required that a theoretical residual hydroxyl value when the amine-modified resin (B) and the blocked isocyanate curing agent are reacted in an electrodeposition coating film during thermal curing is within the range of 30 to 350 mgKOH/g. The "theoretical residual hydroxyl value" as used herein means the hydroxyl value derived from the amine-modified resin (B) remaining in the electrodeposition coating film after the reaction of the amine-modified resin (B) with the blocked isocyanate curing agent, when cured by heating the electrodeposition coating film formed by electrodeposition coating.

In the present invention, furthermore, it is required that a ratio represented by the following formula:

$$R = \frac{(TH)}{[(A)/(B+C)]}$$

wherein TH is theoretical residual hydroxyl value [mgKOH/g] and the [(A)/(B+C)] is the concentration in metal element conversion of the soluble metal compound (A) in the electrodeposition coating composition [% by mass], based on the total of a solid concentration [% by mass] of the amine-modified resin (B) and a solid concentration [% by mass] of the blocked isocyanate curing agent in the electrodeposition coating composition,
is greater than 4,000 and smaller than 400,000 (4,000<R<400,000).

It is possible to accomplish excellent corrosion resistance in the cured electrodeposition coating film by having the theoretical residual hydroxyl value of 30 to 350 mgKOH/g and by adjusting the ratio (R) to the range of greater than 4,000 and smaller than 400,000 (4,000<R<400,000).
It is presumed that this is because the adhesion of the coating film is improved by a hydrogen bond formed from the hydroxyl group derived from the amine-modified resin (B) and the soluble metal compound (A) in the cured electrodeposition coating film after the reaction of the amine-modified resin (B) with the blocked isocyanate curing agent by heat curing.

The curing agent (C) represented by the blocked isocyanate curing agent preferentially reacts with the primary amine of the amine-modified resin (B), and then reacts with the hydroxyl group therein, thereby curing the electrodeposition coating film. Then, it is presumed to improve the adhesion of the coating film by the interaction of the hydroxyl group derived from the amine-modified resin (B) with the soluble metal compound (A) in the cured electrodeposition coating film after the reaction of the amine-modified resin (B) with the blocked isocyanate curing agent by heat curing. Therefore, it is possible to improve both of the corrosion resistance and the adhesion of the coating film by controlling the ratio of the residual hydroxyl value of the amine-modified resin (B) to the concentration in metal conversion of the soluble metal compound (A) within the above range.

In the edge portion of the article to be coated, the chemical conversion film is not only uniformly precipitated, but also the thickness of the electrodeposition coating film is particularly thin with the shrinkage during heat curing because of the shape thereof. Therefore, it is a problem that the edge portion of the article to be coated is not sufficiently covered, and thus is easily corroded. There is a way to improve the coverage at the edge portion by controlling the viscosity of the coating in order to solve the problem, and it is possible to control the viscosity of the coating to some extent by the addition of a pigment and resin particles and the like, but it is difficult to improve the both of the coverage and the coating appearance.

In the present invention, it is possible to accomplish excellent adhesion of the coating film by a hydrogen bond formed from the hydroxyl group of the coating film forming resin and the inorganic substance, by forming the inorganic layer on the surface of the substrate using the soluble metal compound (A) and by controlling the residual hydroxyl value of the amine-modified resin (B) and the concentration in metal conversion of the soluble metal compound (A) and the like so as to adjust the ratio (R) to the predetermined range, and thus the coverage at the edge portion is maintained and the edge corrosion is effectively prevented. Furthermore, it is possible to accomplish sufficient precipitation of inorganic layer at the interface portion between the substrate surface and the electrodeposition coating film by controlling the residual hydroxyl value of the amine-modified resin (B) and the concentration in metal conversion of the soluble metal compound (A) and the like so as to adjust the ratio (R) to the predetermined range, and the viscosity is effectively increased. Therefore, it is possible to accomplish sufficient coverage of the edge portion.

It is possible to obtain sufficient residual hydroxyl group amount by adjusting the ratio (R) to not less than 4,000, and thus the hydrogen bond to the soluble metal compound (A) is sufficiently formed. Therefore, the adhesion of the coating film is improved. On the other hand, it is possible to obtain a proper amount of the residual hydroxyl groups in the cured electrodeposition coating film by adjusting the ratio (R) to not more than 400,000, and thus it is possible to obtain sufficient barrier property to water of the coating film. Therefore, it is possible to obtain good corrosion resistance. The lower limit value of the ratio (R) is more preferably 20,000 and the upper limit value of the ratio (R) is more preferably 200,000. In addition, it is possible to form the sufficient inorganic layer on the surface of the metal substrate to obtain excellent adhesion of the coating film in connection with the residual hydroxyl groups by adjusting the ratio (R) to the range of greater than 4,000 and smaller than 400,000.

The theoretical residual hydroxyl value (TH) when the amine-modified resin (B) reacts with the blocked isocyanate curing agent in the electrodeposition coating film during heat curing is determined by the following formula:

$$TH = \frac{(HB+AB)(MB)}{(MB+MC)} - \frac{IC(MC)}{(MB+MC)}$$

HB: Hydroxyl value of the amine-modified resin (B) [mgKOH/g]

AB: Primary amine value of the amine-modified resin (B) [mgKOH/g]

IC: Isocyanate value of the curing agent (C) [mgKOH/g]

MB: Mass of the amine-modified resin (B)

MC: Mass of the curing agent (C).

For example, if the primary amine value of the amine-modified resin (B) is 17 [mgKOH/g], the hydroxyl value of the amine-modified resin (B) is 240 [mgKOH/g], the isocyanate value of the curing agent (C) is 252 [mgKOH/g], and a ratio of the mass of the amine-modified resin (B) to the mass of the curing agent (C) is 4, the theoretical residual hydroxyl value is 155 [mgKOH/g] as calculated by the following formula: TH=[(17+240)0.8]−(252×0.2)=155.

Nitric Acid or Metal Salt of Nitrous Acid (D)

It is desired that the electrodeposition coating composition of the present invention comprises nitric acid or a metal salt of nitrous acid as the component (D). In general, neutralizing acids to improve the dispersibility of the amine-modified resins are contained in a cationic electrodeposition coating composition. And organic acids such as formic acid, glacial acetic acid or lactic acid is generally used as the neutralizing acid. An organic acid as the neutralized acid used for neutralization of the amine-modified resin (B) is contained also in the electrodeposition coating composition of the present invention. And in the present invention, it is desired to further contain nitric acid separate from the neutralized acid, in addition to the neutralizing acid. Examples of the nitric acids include free nitric acid, nitrates and the like.

In addition, the metal salt of nitrous acid is different from the soluble metal compound (A) and also different from the other additive described below. The metal salt of nitrous acid is preferably divalent metal salt of nitrous acid, particularly preferably calcium salt or zinc salt as the metal salt of nitrous acid from the viewpoint of the coating property. In the present invention, it is possible to promote the deposition of the inorganic layer (the deposition of a layer of the soluble metal compound (A)) on the substrate by using the nitric acid or metal salt of nitrous acid (D), and there is an advantage that it is possible to improve the adhesion and corrosion resistance of the electrodeposition coating film.

As the nitric acid or metal salt of nitrous acid, a metal salt of nitrous acid is more preferable. The metal salt of nitrous acid has very strong oxidizing power, and it is possible to accomplish the effects of promoting the precipitation of the inorganic layer by using the metal salt of nitrous acid in smaller amounts. Therefore, the cathode adhesion is particularly excellent, and the corrosion resistance is improved. Furthermore, since it is possible to exhibit the effects at lower concentration than that of the nitric acid, there is an advantage that it is possible to restrain the reduction of the barrier property of the coating film, and the electrodeposition coating film has excellent corrosion resistance.

In the present invention, since it is possible to greatly promote the deposition of the inorganic layer by adding the metal salt of nitrous acid, the deposition amount of the inorganic layer on the surface of the substrate is increased, the rust resistance of the substrate is improved. Furthermore, since the coverage is further improved because the action of hydrogen bond of the inorganic layer and resin described above is also improved at the edge portion, the corrosion inhibiting effect of the edge portion is significantly exhibited.

It is desired that the content of the nitric acid or metal salt of nitrous acid (D) is within the range of 0.001 to 1% by mass, based on the total mass of the electrodeposition coating composition. The content of the nitric acid or metal salt of nitrous acid (D) is more preferably within the range of 0.01 to 0.5% by mass. Since it is possible to promote the deposition of the inorganic layer on the surface of the substrate by adjusting the content of the nitric acid or metal salt of nitrous acid (D) to not less than 0.001% by mass, it is possible to improve the adhesion and corrosion resistance, and there is an advantage that further good corrosion resistance is obtained. On the other hand, it is possible to improve the both of the corrosion resistance and the coating appearance by adjusting the content of the nitric acid or metal salt of nitrous acid (D) to not more than 1% by mass. In addition, when the acid which can be also used as the nitric acid or metal salt of nitrous acid (D) is used for adjusting pH, it is desired that the total amount including the acid is within the above range.

Plasticizer

It is desired that the electrodeposition coating composition of the present invention contains a plasticizer. Since the internal stress of the coating film is easily increased because of the hydrogen bond formed from the soluble metal compound (A) and amine-modified resin (B), it is possible to reduce the internal stress by containing the plasticizer. The preferred plasticizers are alkylene oxide adducts. The more preferred plasticizers are ethylene oxide adducts and propylene oxide adducts. The addition method is not particularly limited, for example, ethylene oxide adducts to alcohols and bisphenol A, diethylenetriamine propylene oxide adducts, and the reaction products of diethylenetriamine propylene oxide adducts with an epoxy resin may be used.

The content of the plasticizer is preferably 0.1 to 25% by mass, more preferably 1 to 10% by mass, based on the total of the resin solid content of the coating film forming resin.

Chelating Acid (E)

It is desired that the electrodeposition coating composition of the present invention contains a chelating acid (E). Examples of the chelating acids (E) include at least one member selected from the group consisting of sulfonic acid, organic phosphonic acid, organic carboxylic acid, amino acid, aminocarboxylic acid and carboxyl group-containing vinyl resin acid. Since the metal ion derived from the soluble metal compound (A) is the chelated by containing the chelating acid (E) in the electrodeposition coating composition of the present invention, the conductivity is reduced and the appearance of the coating film formed by electrodeposition coating is improved, and there is an advantage that it is possible to form a cured electrodeposition coating film having excellent corrosion resistance.

Examples of the sulfonic acids as the chelating acid (E) include, for example, alkanesulfonic acid having 1 to 20 carbon atoms, phenolsulfonic acid and aminosulfonic acid. The alkyl group having 1 to 20 carbon atoms, which forms the sulfonic acid, may have a substituent such as a hydroxyl group. The preferred sulfonic acids include, for example, methanesulfonic acid, sulfamic acid, phenolsulfonic acid, p-toluenesulfonic acid, aminosulfonic acid, 2-acrylamido-2-methylpropanesulfonic acid (AMPS) and the like.

Examples of the organic phosphonic acids as the chelating acid (E) include, for example, alkylphosphonic acid having 1 to 20 carbon atoms, alkylbisphosphonic acid having 1 to 20 carbon atoms, aromatic phosphonic acid having 6 to 20 carbon atoms and aromatic bisphosphonate having 6 to 20 carbon atoms. The alkyl group having 1 to 20 carbon atoms and aromatic group having 6 to 20 carbon atoms, which form the phosphonic acid, may have a substituent such as a hydroxyl group. The preferred organic phosphonic acids are, for example, 1-hydroxy ethylidene bisphosphonic acid.

Examples of the organic carboxylic acids as the chelating acid (E) include, for example, fatty acids having 3 to 20 carbon atoms, aromatic carboxylic acids having 6 to 20 carbon atoms, oxocarboxylic acids having 2 to 20 carbon atoms, dicarboxylic having 3 to 20 carbon atoms acids and the other carboxylic acids. In addition, it is not intended that the aminocarboxylic acid described below is included in the "organic carboxylic acid" as used herein.

Examples of the fatty acids having 3 to 20 carbon atoms include, for example, propionic acid, butyric acid, dimethyl propionic acid (DMPA), isobutyric acid, valeric acid, isovaleric acid, caproic acid, enanthic acid, caprylic acid, pelargonic acid, capric acid, lauric acid, myristic acid, pentadecylic acid, palmitic acid, margaric acid, stearic acid, oleic acid and the like. Examples of the aromatic carboxylic acids having 6 to 20 carbon atoms include, for example, salicylic acid, gallic acid, benzoic acid, phthalic acid, cinnamic acid and the like.

Examples of the oxocarboxylic acids having 2 to 20 carbon atoms, dicarboxylic having 3 to 20 carbon atoms acids and the other carboxylic acids include, for example, pyruvic acid, oxalic acid, lactic acid, tartaric acid, maleic acid, fumaric acid, malonic acid, succinic acid, malic acid, citric acid, aconitic acid, glutaric acid, adipic acid and the like. Among these, dimethyl propionic acid and lactic acid are preferable.

Examples of the amino acids as the chelating acid (E) include, for example, aspartic acid, glutamic acid, glycine, alanine, valine, leucine, isoleucine, serine, threonine, cysteine, methionine, asparagine, glutamine, proline, phenylalanine, tyrosine, tryptophan and the like. Among them, glycine and aspartic acid are preferable.

The aminocarboxylic acids, which are compounds other than the amino acids, are acids having an amino group and a carboxyl group in the molecule. Examples of the aminocarboxylic acids include, for example, hydroxyethyl ethylenediamine triacetate (HEDTA), nitrilotriacetic acid (NTA), diethylenetriaminepentaacetic acid (DPTA), triethylenetetramine and the like.

The sugar acids as the chelating acid as (E) are sugar derivatives having a carboxyl group, which are obtained by the oxidization of monosaccharides. Examples of the sugar acids include, for example, aldonic acid (such as gluconic acid, galactonic acid, mannonic acid), uronic acid (such as glucuronic acid, galacturonic acid, mannuronic acid), aldaric acid (such as glucaric acid, galactaric acid, such as Mannar acid), iduronic acid, glyceric acid, sialic acid, threonic acid, pangamic acid, ascorbic acid, muramic acid, and lactobionic acid and the like.

Examples of the carboxyl group-containing vinyl resins as the chelating acid (E) include, for example, carboxyl group-containing polyvinyl alcohol resins and the like. The carboxyl group-containing polyvinyl alcohol resin can be prepared, for example, by copolymerizing monomers such as acrylic acid in addition to the vinyl acetate monomer and then hydrolyzing polyvinyl acetate obtained in the preparation procedures of the polyvinyl alcohol.

Among the chelating acids (E), it is more preferable to use the alkanesulfonic acids, organic phosphonic acids, organic carboxylic acids and/or amino acids, and it is particularly preferable to use the methanesulfonic acid, dimethyl propionic acid or lactic acid from the viewpoint of reducing the adverse effect to the chelating function and coating film by the adsorption thereof.

In the present invention, it is desired that the chelating acid (E) is contained in the electrodeposition coating composition on the amount such that it is 0.1 to 10 equivalents of the dissolved compound (A).

The alkanesulfonic acid and/or organic phosphonic acid, if contained as the chelating acid (E) in the electrodeposition coating composition, may be preferably contained on the amount such that a ratio of the total of the number of equivalents of a sulfonic group or phosphonic group in the alkane sulfonic acid and/or organic phosphonic acid to the number of moles of the metal in the soluble metal compound (A) is 0.1:1 to 10:1.

The organic carboxylic acid, amino acid, amino carboxylic acid, sugar acid and/or carboxyl group-containing vinyl resin, if contained as the chelating acid (E) in the electrodeposition coating composition, may be preferably contained on the amount such that a ratio of the total of the number of equivalents of a carboxyl group in these components to the number of moles of the metal in the soluble metal compound (A) is 0.1:1 to 10:1.

It is possible to balance the amount of the chelating acid (E) with that of a metal ion derived from the soluble metal compound (A) by using the chelating acid (E) on the amount such that it is 0.1 to 10 equivalents, based on the soluble metal compound (A). Thereby, there is an advantage that it is possible to ensure the performance of the soluble metal compound (A) and to form the cured electrodeposition coating film further having excellent corrosion resistance without reducing the corrosion resistance by the chelating acid (E).

Aminosilane Compound (F)

It is desired to contain an aminosilane compound (F) in the electrodeposition coating composition of the present invention. Examples of the aminosilane compounds (F) include an aminosilane having at least one amino group per one molecule and the hydrolysis-condensation product of the aminosilane.

Examples of the aminosilanes having at least one amino group per one molecule include N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, hydrochloride of N-(vinyl benzyl)-2-aminoethyl-3-aminopropyltrimethoxysilane and the like. Examples of amino group-containing silane coupling agents, which is commercially available, include "KBM-602", "KBM-603", "KBE-603", "KBM-903", "KBE-903", "KBE-9103", "KBM-573", "KBP-90" (trade name; manufactured by Shin-Etsu Chemical Co., Ltd.), "XS1003" (trade name; manufactured by Chisso Corporation) and the like.

It is also possible to using the hydrolysis-condensation product of the aminosilane as the aminosilane compound (F). There is an advantage that it is possible to improve the adhesion of the electrodeposition coating film to the article to be coated by using the hydrolysis-condensation product of the aminosilane. The molecular weight of the hydrolysis-condensation product of the aminosilane is not particularly limited, but it is desired that it has high molecular weight from the viewpoint of improving the corrosion resistance. The high molecular weight as used herein refers to the hydrolysis-condensation product having a three-dimensional condensation structure of Si. When performing the hydrolytic condensation reaction of the aminosilane, it is desired to perform the reaction under conditions such that the aminosilane is easily hydrolyzed and easily condensed. Examples of the conditions include, for example, reaction conditions using an alcohol solvent, reaction conditions using the formulation so as to result in co-condensation rather than mono-condensation described above and the like. In addition, it is possible to obtain the hydrolysis-condensation product under the condition of higher condensation rate, which has higher molecular weight, by performing the reaction under the condition such that the aminosilane concentration is relatively high. Concretely, it is desired to perform the condensation reaction in the aminosilane concentration of 5 to 50% by mass. Further, if necessary, the co-condensation of the aminosilane with alkoxysilanes having no amino group, such as epoxysilane "KBM-403" (trade name; manufactured by Shin-Etsu Chemical Co., Ltd.) may be performed.

There is an advantage that it is possible to improve the adhesion and corrosion resistance by the action of the amino group of the aminosilane compound (F) by containing the aminosilane compound (F) in the electrodeposition coating composition.

When using in the electrodeposition coating composition of the present invention, it is desired to adjust the content of the aminosilane compound (F) to the range of 0.001 to 0.5% by mass, based on the total mass of the electrodeposition coating composition. It is possible to obtain the effects accomplished by using the aminosilane compound (F) by adjusting the content of the aminosilane compound (F) to not less than 0.001% by mass. On the other hand, it is possible to obtain the effects of improving the corrosion resistance depending on the content thereof by adjusting the content of the aminosilane compound (F) to not more than 0.5% by mass, and it is economically advantageous. In addition, when the aminosilane compound (F) is used for adjusting pH and used in a cationic dispersing agent for the soluble metal compound (A), it is desired that the total amount including the aminosilane compound is within the above range.

Aluminum Complex (G)

The electrodeposition coating composition of the present invention preferably contains an aluminum complex (G). Examples of the aluminum complexes (G) include aluminum fluoride complexes and the like. The aluminum fluoride complex can be a complex formed by adding the aluminum compounds such as aluminum nitrate, aluminum sulfate or aluminum hydroxide to the electrodeposition coating composition. There is an advantage to remarkably improve the corrosion resistance by further containing the corrosion resistance in the electrodeposition coating composition. It is presumed that it is due to the following mechanism. This is because aluminum fluoride complex is formed in the electrodeposition coating composition by the reaction of the aluminum compound with the fluorine derived from a fluorine compound such as zirconium fluoride by adding aluminum compounds such as aluminum nitrate, aluminum sulfate or aluminum hydroxide in the electrodeposition coating composition. It is possible to promote the formation of the inorganic layer by the deposition of metal ions derived from the soluble metal compound (A) by forming the aluminum fluoride complex, and thereby the corrosion resistance of the coating film obtained is improved.

When the electrodeposition coating composition of the present invention contains the aluminum complex (G), it is desired that the content of the aluminum complex (G), based on the electrodeposition coating composition, is within the range of 0.001 to 0.1% by mass in aluminum metal element conversion. It is possible to obtain the effects of improving the corrosion resistance accomplished by using the aluminum complex (G) by adjusting the content of the aluminum complex (G) to not less than 0.001% by mass. On the other hand, it is possible to obtain the effects of improving the corrosion resistance depending on the content thereof by adjusting the content of the aluminum complex (G) to not more than 0.1% by mass, and it is economically advantageous.

Other Components

Pigment

The electrodeposition coating composition of the present invention can contain pigments when the pigments are contained in the electrodeposition coating composition, conventionally used in the electrodeposition coating composition. Examples of pigments that can be used in the present invention include inorganic pigments that are commonly used, for example, coloring pigments such as titanium white, carbon black and red iron oxide; extender pigments such as kaolin, talc, aluminum silicate, calcium carbonate, mica and clay; rust preventive pigments such as iron phosphate, aluminum phosphate, calcium phosphate, aluminum tripolyphosphate, aluminum phosphomolybdate, aluminum-zinc phosphomolybdic acid and the like. When the pigments are contained in the electrodeposition coating composition, it is desired that the amount of the pigment is within the range of from 1 to 30% by mass, based on the resin solid content of the electrodeposition coating composition.

When the pigment is used as a component of the electrodeposition coating, it is a common way to form the pigment into a paste (pigment-dispersed paste) by dispersing the pigment in an aqueous solvent at a high concentration in advance. Since the pigment is a powdery, it is because it is difficult to disperse the pigment to the uniform state at low concentration thereof in one step. The paste is generally referred to a pigment dispersion paste.

The pigment dispersion paste is prepared by dispersing the pigment in an aqueous solvent together with a pigment dispersing resin. Examples of the pigment dispersing resins include pigment dispersing resins having a cationic group, such as modified epoxy resins having at least one member selected from the group consisting of a quaternary ammonium group, a tertiary sulfonium group and a primary amine group. Examples of the aqueous solvents include deionized water, water containing a small amount of alcohols and the like. In general, the pigment dispersing resin is used on the amount of 20 to 100 parts by mass of the resin solid content ratio to 100 parts by mass of the pigment. After mixing a pigment dispersing resin with a pigment, it is possible to obtain a pigment dispersion paste by dispersing the mixture with a common dispersing device, such as a ball mill and a sand grinding mill until the particle diameter of the pigment in the mixture is a predetermined uniform particle diameter.

Other Additives

If necessary, the electrodeposition coating composition of the present invention may contain an additive for a conventional coating, for example, organic solvents such as ethylene glycol monobutyl ether, ethylene glycol monohexyl ether, ethylene glycol monoethylhexyl ether, propylene glycol monobutyl ether, dipropylene glycol monobutyl ether, and propylene glycol monophenyl ether; dry inhibitor; surfactants such as an antifoaming agent; viscosity modifiers such as acrylic resin microparticles; cissing inhibitors; inorganic rust inhibitors such as vanadium, copper, iron, manganese, magnesium, calcium salts; and the like. In addition, well known additives other than the above additives, such as auxiliary complexing agents, buffering agents, smoothing agents, stress relaxation agent, brightening agent, semi-gloss agent, antioxidants, an ultraviolet absorber and the like can be further incorporated depending on the purposes.

Other Coating Film Forming Resins

The electrodeposition coating composition of the present invention may contain an amine-modified resin, which is different from the amine-modified resin (B), and/or other coating film forming resin component. Examples of the other coating film forming resin components include, for example, acrylic resins, polyester resins, urethane resins, butadiene resins, phenol resins, xylene resins and the like. The preferred other coating film forming resin components, which may be contained in the electrodeposition coating composition, are phenol resins and xylene resins. Examples of the phenol resins and xylene resins include, for example, a xylene resin having 2 to 10 aromatic rings and the like.

The "resin solid content" as used herein means the mass of the total solid content of the coating film forming resin contained in the electrodeposition coating composition. Concretely, it means the total of the solid content mass of the amine-modified resin (B), curing agent (C) and optionally other coating film forming resin components.

It is desired that the resin solid content of the electrodeposition coating composition is within the range of 1 to 30% by mass, based on the electrodeposition coating composition. When the resin solid content of the electrodeposition coating composition is less than 1% by mass, the deposition amount of the electrodeposition coating film is reduced, and it is difficult to ensure sufficient corrosion resistance. On the other hand, when the resin solid content of the electrodeposition coating composition is more than 30% by mass, there is a possibility that the throwing power and coating appearance are deteriorated.

Preparation of Electrodeposition Coating Composition

The electrodeposition coating composition of the present invention can be prepared by mixing emulsion containing an amine-modified resin (B) and curing agent (C), and optionally pigment dispersion paste with a soluble metal compound (A), and optionally nitric acid or a metal salt of nitrous acid (D), a chelating acid (E), an aminosilane compound (F) and/or an aluminum compound for forming an aluminum complex (G), a plasticizer and the like.

In the preparation of the electrodeposition coating composition, the emulsion is formed by neutralizing the amine-modified resin (B) with a neutralizing acid to improve the dispersibility. Examples of the neutralizing acids used for neutralizing the amine-modified resin (B) include organic acids such as formic acid, acetic acid, lactic acid and the like. In the present invention, it is more preferable to neutralize the amine-modified resin (B) with formic acid and disperse it. When using formic acid as a neutralizing acid used for neutralizing the amine-modified resin (B), there is an advantage that the throwing power is superior because of high degree of dissociation.

It is desired that the amount of the neutralizing acid used is within the range of 10 to 25 mg equivalents, based on 100 g of the resin solid content of the amine-modified resins (B), curing agent (C) and optionally the coating film forming resin. The lower limit value is more preferably 15 mg equivalents and the upper limit value is more preferably 20 mg equivalents. When the amount of the neutralizing acid is not less than 10 mg equivalents, the affinity to water is sufficient, and the dispersibility in water is good. On the other hand, when the amount of the neutralizing acid is not more than 25 mg equivalents, the amount of electricity required for the precipitation is proper, and the deposition property and throwing power of the coating solid content are improved.

It is required that the amount of the curing agent (C) is sufficient to give good cured coating film by reacting with an active hydrogen-containing functional groups, such as a primary amino group, a secondary amino group, hydroxyl group in the amine-modified resin (B) during curing. The amount of the curing agent (C) is within the range of preferably 90/10 to 50/50, more preferably 80/20 to 65/35 represented as a solid content mass ratio (of the amine-modified resin (B) to the curing agent (C)). The fluidity and the curing rate of the coating film (deposited film) during forming the coating film are improved by adjusting the solid content mass ratio of the amine-modified resin (B) to the curing agent (C), and the coating appearance is improved.

The electrodeposition coating composition of the present invention can be prepared by mixing resin emulsion in which an amine-modified resin (B), a curing agent (C) and optionally other coating film forming resin are dispersed with a neutralizing acid, a pigment dispersion paste and a soluble metal compound (A), and optionally nitric acid or a metal salt of nitrous acid (D), a chelating acid (E), an aminosilane compound (F) and/or an aluminum complex (G), a plasticizer and the like. In addition, the soluble metal compound (A) may be added in the form of the pigment dispersion paste together with the pigment.

It is desired that the electrodeposition coating composition of the present invention has pH of 2 to 6. In addition, it is desired that the mg equivalent of acid (MEQ (A)) is within the range of 40 to 120, based on 100 g of the resin solid content of the electrodeposition coating composition. Furthermore, the mg equivalent of acid (MEQ (A)), based on 100 g of the resin solid content of the electrodeposition coating composition, can be adjusted by the amount of the neutralizing acid and the amount of free acid.

The "MEQ (A)" as used herein, which is an abbreviation for "mg equivalent (acid)", means the total of mg equivalents of all acids per 100 g of the solid content of the coating. The MEQ (A) is determined by measuring the amount of the acid contained in the electrodeposition coating composition by the potentiometric titration with 1/10N NaOH solution, after about 10 g of the electrodeposition coating composition precisely weighed is dissolved in about 50 ml of solvent (THF). The pH of the electrodeposition coating composition can be measured using a pH meter commercially available having a temperature compensation function.

It is desired that the electrodeposition coating composition of the present invention does not substantially contain any of tin compound and lead compound. The wording "the electrodeposition coating composition of the present invention does not substantially contain any of tin compound and lead compound" as used herein means that the concentration of the lead compound contained in the electrodeposition coating composition is not more than 50 ppm as lead metal element and the concentration of the organic tin compound contained in the electrodeposition coating composition is not more than 50 ppm as tin metal element. In the electrodeposition coating composition of the present invention, a soluble metal compound (A) comprising at least one metal selected from the group consisting of Ti, Bi, Zn, Y, Nd, La and Zr is contained. Therefore, it is not necessary to use a lead compound and an organic tin compound as a curing catalyst. Thereby, it is possible to prepare the electrodeposition coating composition, which does not substantially contain any of the tin compound and lead compound.

Electrode Position Coating and Electrodeposition Coating Film Formation Article to be Coated It is possible to use various electrically energizable articles to be coated as an article to be coated, on which the electrodeposition coating composition of the present invention. Examples of articles to be coated usable that can be used include, for example, articles to be coated constituted from cold-rolled steel sheet, hot-rolled steel sheet, stainless steel, electro-galvanized steel sheet, hot-dip galvanized steel sheet, zinc-aluminum alloy-based plated steel sheet, zinc-iron alloy-based plated steel sheet, zinc-magnesium alloy-based plated steel sheet, zinc-aluminum-magnesium alloy-based plated steel sheet, aluminum-based plated steel sheet, aluminum-silicon alloy-based plated steel sheet, tin-based plated steel sheet, and the like.

The electrodeposition coating composition of the present invention can be suitably used for the coating using an article to be coated having a chemical conversion coating formed from zirconium-based chemical conversion treatment composition. In electrodeposition coating using the common electrodeposition coating composition, zinc phosphate-based chemical conversion treatment is performed on the article to be coated before electrodeposition coating. It is possible to improve the corrosion resistance of the coating film formed, and thereby the adhesion between the article to be coated and the coating film is further improved by performing the chemical conversion treatment on the article to be coated. While having these advantages in the case of performing the chemical conversion treatment before electrodeposition coating, there are problems of forming sludge in the case of using a zinc phosphate-based chemical conversion treatment agent. In addition, in the case of performing the chemical conversion treatment using the zinc phosphate-based chemical conversion treatment agent, the coating step is complicated because a step of cleaning chemical conversion treatment is essential, and there are problems that costs providing the equipment and maintenance costs may occur.

On the other hand, in the electrodeposition coating composition of the present invention, even in the case of forming the coating film using the article to be coated having a chemical conversion coating formed by zirconium-based chemical conversion treatment composition, it is possible to form the coating film having excellent corrosion resistance. It is possible to reduce the cost and effort required for treating the sludge due to the zinc phosphate-based chemical conversion treatment by using the electrodeposition coating composition of the present invention.

Examples of the zirconium-based chemical conversion treatment compositions include zirconium-based chemical conversion treatment compositions commonly used by a person with ordinary skill in the art. Concrete examples of the zirconium-based chemical conversion treatment compositions include, for example, a zirconium-based chemical conversion treatment composition containing an adhesion imparting agent and a corrosion resistance imparting agent, such as fluorine; at least one member selected from the group consisting of zirconium, titanium and hafnium; and polyamine water-soluble resin; and the like.

In addition, before the zirconium-based chemical conversion treatment, it foreign substances such as antirust oil, processing oil adhered to the article to be coated, if necessary, may be removed by using an alkaline degreasing solution and/or wash water.

Electrodeposition Coating Step

The electrodeposition coating is usually performed by applying a voltage of 50 to 450V between the anode and the article to be coated as the cathode. When the applied voltage is less than 50V, there is a possibility that the electrodeposition is insufficient. On the other hand, when the applied voltage is more than 450V, there is a possibility that the coating film is destroyed, and it has an abnormal appearance. The temperature of the bath liquid of the coating composition is commonly adjusted to 10 to 45° C. during electrodeposition coating.

The electrodeposition coating step comprises the stages of immersing the article to be coated in the electrodeposition coating composition, and applying a voltage between an anode and the article to be coated as a cathode, precipitating the coating. In addition, the time for applying the voltage varies depending on the electrodeposition conditions, but in general, it may be within the range of 2 to 5 minutes.

It is desired for the electrodeposition coating film after baking and curing to have a thickness of 5 to 40 μm, and more preferably 10 to 25 μm. When the thickness of the electrodeposition coating film is less than 5 μm, there is a possibility that the corrosion resistance is insufficient. On the other hand, when the thickness of the electrodeposition coating film is more than 40 μm, the waste of the coating is caused.

The baked and cured electrodeposition coating film is formed by baking the electrodeposition coating film obtained in the manner described above at 120 to 260° C., preferably 140 to 220° C. for 10 to 30 minutes after the electrodeposition step is performed and then the washing with water is performed or not.

In the electrodeposition coating composition of the present invention, even when electrodeposition coating using the article to be coated with a chemical conversion coating formed by the zirconium-based chemical conversion treatment composition, there is an advantage that excellent corrosion resistance is obtained. In the electrodeposition coating composition of the present invention, the specified soluble metal compound (A) is contained, and there is a feature that the theoretical residual hydroxyl value when it is reacted in the electrodeposition coating film during thermal curing is within the range of 20 to 350 mgKOH/g and the ratio (R) obtained by the formula described above is greater than 4,000 and smaller than 400,000 (4,000<R<400,000). And by the feature, excellent adhesion is obtained in the cured electrodeposition coating film by a hydrogen bond formed from the hydroxyl group derived from the amine-modified resin (B) and the soluble metal compound (A) in the cured electrodeposition coating film after the reaction of the amine-modified resin (B) with the blocked isocyanate curing agent by heat curing. As the result, there is an advantage that it is possible to obtain the coating film having excellent corrosion resistance and excellent coating appearance with high coating film smoothness.

EXAMPLES

The present invention is more concretely illustrated below according to Examples; but the present invention is not limited only to these Examples. In Examples, unless otherwise noted, "parts" and "%" are by mass basis.

Preparation Example 1-A

Preparation of Amine-Modified Resin (Resin A)

To a reaction vessel, 92 parts of methyl isobutyl ketone, 940 parts of bisphenol A type epoxy resin (trade name "DER-331J", manufactured by Dow Chemical Company), 350 parts of bisphenol A, 95 parts of octylic acid and 2 parts of dimethylbenzylamine were added, then were reacted until the epoxy equivalent is 1170 g/eq while maintaining the temperature in reaction vessel to 120° C., and were cooled until the temperature was 110° C. Then a mixture of 82 parts of diethylenetriamine (a methyl isobutyl ketone solution having a solid content of 73%), 26 parts of N-methyl-ethanolamine diethylenetriamine and 60 parts of diethanolamine was added, and reacted for 1 hour at 110° C. to obtain an amine-modified resin (a cation-modified epoxy resin: Resin A).

The resin had a number average molecular weight of 2,600, an amine value of 58 mgKOH/g (an amine value derived from primary amines of 17 mgKOH/g among it) and a hydroxyl value of 240 mgKOH/g.

Preparation Example 1-B

Preparation of Amine-Modified Resin (Resin B)

To a reaction vessel, 50 parts of methyl isobutyl ketone, 940 parts of bisphenol A type epoxy resin (trade name "DER-331J", manufactured by Dow Chemical Company), 350 parts of bisphenol A, 42 parts of octylic acid and 2 parts of dimethylbenzylamine were added, then were reacted until the epoxy equivalent is 873 g/eq while maintaining the temperature in reaction vessel to 120° C., and were cooled until the temperature was 110° C. Then a mixture of 106 parts of diethylenetriamine (a methyl isobutyl ketone solution having a solid content of 73%) and 110 parts of diethanolamine was added, and reacted for 1 hour at 110° C. to obtain an amine-modified resin (a cation-modified epoxy resin: Resin B).

The resin had a number average molecular weight of 2,600, an amine value of 75 mgKOH/g (an amine value derived from primary amines of 22 mgKOH/g among it) and a hydroxyl value of 255 mgKOH/g.

Preparation Example 1-D

Preparation of Amine-Modified Resin (Resin D)

Into a reaction vessel equipped with a stirrer, a decanter, a nitrogen introducing tube, a thermometer and a dropping funnel, 2,400 parts of bisphenol A type epoxy resin having an epoxy equivalent weight of 188 g/eq (trade name "DER-331J", manufactured by Dow Chemical Company) and 141 parts of methanol, 168 parts of methyl isobutyl ketone were charged and were uniformly dissolved by stirring it at 40° C., and then 320 parts of 2, 4-/0.2, 6-tolylene diisocyanate (80/20 mass ratio mixture) was added dropwise over 30 minutes. After completion of the dropwise addition, the temperature was raised to 70° C. by generating heat. Thereto 5 parts of N,N-dimethylbenzylamine was added, the temperature in the reaction vessel was raised to 120° C., and then the reaction was continued for 3 hours at 120° C. until the epoxy equivalent is 500 g/eq while methanol was distilled off. Further, 644 parts of methyl isobutyl ketone, 341 parts of bisphenol A and 413 parts of 2-ethyl hexanoic acid, was added thereto, then were reacted until the epoxy equivalent is 1070 g/eq while maintaining the temperature in the reaction vessel to 120° C., and were cooled until the temperature was 110° C. Then a mixture of 241 parts of diethylenetriamine (a methyl isobutyl ketone solution having a solid content of 73%) and 192 parts of N-methylethanolamine was added, and reacted for 1 hour at 110° C. to obtain an amine-modified resin (a cation-modified epoxy resin: Resin D).

The resin had a number average molecular weight of 2,100, an amine value of 74 mgKOH/g (an amine value derived from primary amines of 16 mgKOH/g among it) and a hydroxyl value of 160 mgKOH/g. In addition, it was confirmed to have an oxazolidone ring (absorption wavelength; 1750 cm$^{-1}$) by the measurement of the infrared absorption spectrum and the like.

Preparation Example 1-E

Preparation of Amine-Modified Resin (Resin E)

To a reaction vessel, 92 parts of methyl isobutyl ketone, 940 parts of bisphenol A type epoxy resin (trade name "DER-331J", manufactured by Dow Chemical Company), 350 parts of bisphenol A, 30 parts of octylic acid and 2 parts of dimethylbenzylamine were added, then were reacted until the epoxy equivalent is 820 g/eq while maintaining the temperature in reaction vessel to 120° C., and were cooled until the temperature was 110° C. Then 160 parts of diethanolamine was added, and reacted for 1 hour at 110° C. to obtain an amine-modified resin (a cation-modified epoxy resin: Resin E).

The resin had a number average molecular weight of 2,600, an amine value of 58 mgKOH/g and a hydroxyl value of 310 mgKOH/g.

Preparation Example 1-F

Preparation of Amine-Modified Resin (Resin F)

To a reaction vessel, 92 parts of methyl isobutyl ketone, 940 parts of bisphenol A type epoxy resin (trade name "DER-331J", manufactured by Dow Chemical Company), 390 parts of bisphenol A, 80 parts of octylic acid and 2 parts of dimethylbenzylamine were added, then were reacted until the epoxy equivalent is 1400 g/eq while maintaining the temperature in reaction vessel to 120° C., and were cooled until the temperature was 110° C. Then a mixture of 100 parts of diethanolamine and 120 parts diethylenetriamine propylene oxide 37 mole adduct was added, and reacted for 1 hour at 110° C. to obtain an amine-modified resin (a cation-modified epoxy resin: Resin F).

The resin had a number average molecular weight of 3,300, an amine value of 37 mgKOH/g (an amine value derived from primary amines of 3 mgKOH/g among it) and a hydroxyl value of 240 mgKOH/g.

Preparation Example 1-G

Preparation of Amine-Modified Resin (Resin G)

To a reaction vessel, 92 parts of methyl isobutyl ketone, 940 parts of bisphenol A type epoxy resin (trade name "DER-331J", manufactured by Dow Chemical Company), 390 parts of bisphenol A, 70 parts of dimethyl propionic acid (DMPA) and 2 parts of dimethylbenzylamine were added, then were reacted until the epoxy equivalent is 1400 g/eq while maintaining the temperature in reaction vessel to 120° C., and were cooled until the temperature was 110° C. Then a mixture of 100 parts of diethanolamine and 120 parts of diethylenetriamine propylene oxide 37 mole adduct was added, and reacted for 1 hour at 110° C. to obtain an amine-modified resin (a cation-modified epoxy resin: Resin G).

The resin had a number average molecular weight of 3,300, an amine value of 37 mgKOH/g (an amine value derived from primary amines of 3 mgKOH/g among it) and a hydroxyl value of 280 mgKOH/g.

Preparation Example 1-H

Preparation of Amine-Modified Resin (Resin H)

To a reaction vessel, 92 parts of methyl isobutyl ketone, 940 parts of bisphenol A type epoxy resin (trade name "DER-331J", manufactured by Dow Chemical Company), 270 parts of octylic acid and 2 parts of dimethylbenzylamine were added, then were reacted until the epoxy equivalent is 380 g/eq while maintaining the temperature in reaction vessel to 120° C., and were cooled until the temperature was 110° C. Then, 320 parts of diethanolamine was added, and reacted for 1 hour at 110° C. to obtain an amine-modified resin (a cation-modified epoxy resin: Resin H).

The resin had a number average molecular weight of 800, an amine value of 110 mgKOH/g and a hydroxyl value of 410 mgKOH/g.

Preparation Example 2-1

Preparation of Blocked Isocyanate Curing Agent (1)

Into a reaction vessel, 1680 parts of hexamethylene diisocyanate (HDI) and 732 parts of MIBK, and heated to 60° C. A solution of 346 parts of trimethylolpropane dissolved in 1067 parts of MEK oxime was added dropwise over 2 hours at 60° C. thereto. After further heating for 4 hours at 75° C., it was confirmed that the absorption based on an isocyanate group was disappeared by the measurement of IR spectrum. After cooling, 27 parts of MIBK was added to obtain a blocked isocyanate curing agent (1) having a solid content of 78%. The isocyanate group value thereof was 252 mgKOH/g.

Preparation Example 2-2

Preparation of Blocked Isocyanate Curing Agent (2)

Into a reaction vessel, 1340 parts of diphenylmethane diisocyanate and 277 parts of MIBK, and heated to 80° C. A solution of 226 parts of ε-caprolactam dissolved in 944 parts of butyl cellosolve was added dropwise over 2 hours at 80° C. thereto. After further heating for 4 hours at 100° C., it was confirmed that the absorption based on an isocyanate group was disappeared by the measurement of IR spectrum. After cooling, 349 parts of MIBK was added to obtain a blocked isocyanate curing agent (2) having a solid content of 80%. The isocyanate group value thereof was 251 mgKOH/g.

Preparation Example 3

Preparation of Pigment Dispersing Resin

Into a reaction vessel equipped with a stirrer, a cooling tube, a nitrogen introducing tube and a thermometer, 385 parts of bisphenol A type epoxy resin, 120 parts of bisphenol A, 95 parts of octylic acid and 1 part of 1% solution of 2-ethyl-4-methylimidazole were charged, and were reacted for 1 hour at 160 to 170° C. under a nitrogen atmosphere. After cooling to 120° C., 198 parts of a methyl isobutyl ketone solution of 2-ethylhexanol half-blocked tolylene diisocyanate (having a solid content of 95%) was added thereto. After maintaining the reaction mixture for 1 hour for 120 to 130° C., 157 part of ethylene glycol mono-n-butyl ether was added. It was homogenized after cooling to 85 to 95° C. Then, 277 parts of diethylenetriamine diketimine (a methyl isobutyl ketone solution having a solid content of 73%) was added and stirred for 1 hour at 120° C., and 13 parts of ethylene glycol mono n-butyl ether was added to prepare an amine-modified resin. Then, 18 parts of ion-exchanged water and 8 parts of formic acid were mixed with the amine-modified resin and stirred for 15 minutes, and then 200 parts of ion-exchanged water was mixed to obtain, a resin solution (resin solid content of 25%) of a pigment dispersing resin (an average molecular weight of 2,200).

Preparation Examples 4-A and 4-B

Preparation of Electrodeposition Coating Resin Emulsion (EmA) to (EmB)

The resin (Resin A) obtained in Preparation Example 1-A of 400 g (in a solid content) was mixed with 100 g (in a solid content) of the blocked isocyanate curing agent (1) obtained in Preparation Example 2-1, and ethylene glycol mono-2-ethylhexyl ether was added until the concentration thereof is 3%, based on the solid content. Then, it was neutralized by adding formic acid such that the neutralization index is 40%, and diluted slowly by adding deionized water. Then, the methyl isobutyl ketone was removed under reduced pressure such that the solid content is 36% to obtain an electrodeposition coating resin emulsion (EmA).

Except that the resin (Resin B) obtained in Preparation Example 1-B was used instead of the resin (Resin A) obtained in Preparation Example 1-A, an electrodeposition coating resin emulsion (EmB) was obtained in the same manner.

Preparation Example 4-C

Preparation of Electrodeposition Coating Resin Emulsion (EmC)

The resin (Resin A) obtained in Preparation Example 1-A of 350 g (in a solid content), 100 g (in a solid content) of the blocked isocyanate curing agent (1) obtained in Preparation Example 2-1 and "NIKANOL LLL" (manufactured by Food, Ltd., a solids content of 50 g), which is a xylene resin, were mixed, and ethylene glycol mono-2-ethylhexyl ether was added until the concentration thereof is 3% (15 g), based on the solid content. Then, it was neutralized by adding formic acid such that the neutralization index is 40%, and diluted slowly by adding deionized water. Then, the methyl isobutyl ketone was removed under reduced pressure such that the solid content is 36% to obtain an electrodeposition coating resin emulsion (EmC).

Preparation Example 4-D

Preparation of Electrodeposition Coating Resin Emulsion (EmD)

The resin (Resin D) obtained in Preparation Example 1-D of 340 g (in a solid content), 80 g (in a solid content) of the blocked isocyanate curing agent (1) obtained in Preparation Example 2-1 and 80 g (in a solid content) of the blocked isocyanate curing agent (2) obtained in Preparation Example 2-2 were mixed, and ethylene glycol mono-2-ethylhexyl ether was added until the concentration thereof is 3% (15 g), based on the solid content. Then, it was neutralized by adding formic acid such that the neutralization index is 40%, and diluted slowly by adding deionized water. Then, the methyl isobutyl ketone was removed under reduced pressure such that the solid content is 36% to obtain an electrodeposition coating resin emulsion (EmD).

Preparation Examples 4-E to 4-G

Preparation of Electrodeposition Coating Resin Emulsion (EmE) to (EmG)

The resin (Resin E) obtained in Preparation Example 1-E of 400 g (in a solid content), 50 g (in a solid content) of the blocked isocyanate curing agent (1) obtained in Preparation Example 2-1 and 50 g (in a solid content) of the blocked isocyanate curing agent (2) were mixed, and ethylene glycol mono-2-ethylhexyl ether was added until the concentration thereof is 3% (15 g), based on the solid content. Then, it was neutralized by adding formic acid such that the neutralization index is 80%, and diluted slowly by adding deionized water. Then, the methyl isobutyl ketone was removed under reduced pressure such that the solid content is 36% to obtain an electrodeposition coating resin emulsion (EmE).

Except that the resin (Resin F) obtained in Preparation Example 1-F and the resin (Resin G) obtained in Preparation Example 1-G were used, respectively instead of the resin (Resin E) obtained in Preparation Example 1-E, an electrodeposition coating resin emulsion (EmF) and electrodeposition coating resin emulsion (EmG) were obtained in the same manner.

Preparation Example 4-H

Preparation of Electrodeposition Coating Resin Emulsion (EmH)

The resin (Resin E) obtained in Preparation Example 1-E of 360 g (in a solid content), 40 g (in a solid content) of the resin (Resin H) obtained in Preparation Example 1-H, 50 g (in a solid content) of the blocked isocyanate curing agent (1) obtained in Preparation Example 2-1 and 50 g (in a solid content) of the blocked isocyanate curing agent (2) were mixed, and ethylene glycol mono-2-ethylhexyl ether was added until the concentration thereof is 3% (15 g), based on the solid content. Then, it was neutralized by adding formic acid such that the neutralization index is 80%, and diluted slowly by adding deionized water. Then, the methyl isobutyl ketone was removed under reduced pressure such that the solid content is 36% to obtain an electrodeposition coating resin emulsion (EmH).

Preparation Example 5

Preparation of Pigment Dispersion Paste for Electrodeposition Coating

The components of the formulation shown in Table 1 including the pigment dispersion paste obtained in Preparation Example 3 are mixed using a sand mill, and a pigment dispersion paste (a solid content of 49%) was obtained by dispersing the mixture at 40° C. until the volume average particle diameter D50 thereof is 0.6 μm. The volume average particle diameter D50 was measured using a laser Doppler system particle size analyzer ("Microtrack UPA150", manufactured by Nikkiso Co., Ltd.) after the dispersion was diluted with deionized water in order to obtain a proper signal level.

TABLE 1

| Composition | Amount (parts by weight) |
|---|---|
| Pigment dispersing resin of Preparation Example 3 | 50 |
| Titanium dioxide | 50 |
| Carbon black | 1 |
| Dibutyltin oxide | 2 |
| Clay | 7 |
| Ion exchanged water | 39 |

Example 1

To a stainless steel container, 1394 g of ion exchange water, and 3.4 g of 40% fluorozirconic acid (reagent) and 0.8 g of zinc oxide as soluble metal compounds (A) were added. The zinc oxide (Zn (ZnO)) was used in the form such that 0.8 g of the zinc oxide (reagent) and 0.64 g of the pigment dispersing resin obtained in Preparation Example 3 were mixed at a mass ratio of the zinc oxide to pigment dispersing resin is 1:0.2 and was dispersed with a sand mill until the volume average particle diameter D50 is 0.6 μm. Then, 560 g of the resin emulsion (EmA) and 41 g of the pigment dispersion paste obtained in Production Example 5 were added, and an electrodeposition coating composition was formed by performing the aging for 16 hours at 40° C.

Examples 2 to 28 and Comparative Examples 1 to 8

Preparation of Electrodeposition Coating Composition

The electrodeposition coating compositions were formed as described in Example 1, except that the soluble metal compounds (A), the resin emulsion ((EmA) to (EmH)), free nitric acid and calcium nitrate (manufactured by Nissan Chemical Industries, Ltd.) as the nitric acid or a metal salt of nitrous acid (D), the chelating [concretely lactic acid (Showa Chemical Co., 50% purity), methanesulfonic acid (reagent) or dimethyl propionic acid (DMPA, reagent)], the other acids and the other components [pigment, aminosilane compound (F), aluminum nitrate, BPAEO adduct] were used on the formulation amount shown in the following Table 2 and Table 3.

As the soluble metal compounds (A), 40% fluorotitanic acid (reagent), yttrium nitrate (reagent), bismuth lactate, zinc oxide (reagent), zinc phosphate and/or 40% fluorozirconic acid (reagent) are used and as the nitric acid or a metal salt of nitrous acid (D), calcium nitrate (Nissan Chemical Industries, Ltd.) and free nitric acid are used. As the chelating acid (E), lactic acid (Showa Chemical Co., 50% purity), methanesulfonic acid (reagent) or dimethyl propionic acid (DMPA, reagent) are used. The hydrolysis-condensation product of organosilane as the aminosilane compound (F) and aluminum nitrate (reagent) as a source of supply of the aluminum complex (G) were added at the concentration shown in the following Table 2 and Table 3. In electrodeposition coating composition, an aluminum fluoride complex (G) is formed by aluminum derived from the aluminum nitrate and fluorine derived from the fluorozirconic acid.

Note that the pigment dispersion paste of Preparation Example 5 is not used only in Example 24.

The zinc oxide (Zn (ZnO)) was used in the form such that the zinc oxide (reagent) and the pigment dispersing resin obtained in Preparation Example 3 were mixed at a mass ratio of the zinc oxide to pigment dispersing resin is 1:0.2 and was microdispersed with a sand mill until the volume average particle diameter D50 is 0.6 μm.

The bismuth lactate as the soluble metal compound (A) was prepared by mixing in advance 1 part by mass of bismuth hydroxide with 2 parts by mass of 50% aqueous solution of the lactic acid.

The zinc phosphate microparticle as the soluble metal compound (A) was prepared by adding 30 g of aminosilane ("KBM603") to 570 g of deionized water with stirring, hydrolyzing for 30 minutes at room temperature, adding 400 g of zinc phosphate (reagent), stirring for 10 minutes and microdispersing with a sand mill until the volume average particle diameter D50 is 0.6 μm.

The yttrium nitrate, fluorozirconic acid and fluorotitanic acid as the soluble metal compounds (A) were used without the microdispersion thereof in advance.

In Example 23, the following aminosilane compounds were added.

As the hydrolysis-condensation product of organosilane, a hydrolysis-condensation product of organosilane obtained by uniformly adding dropwise 15 parts by mass of "KBE903"

(3-aminopropyl triethoxysilane, trade name, manufactured by Shin-Etsu Chemical Co., Ltd.) and 15 parts by mass of "KBE603" (N-2-(aminoethyl)-3-aminopropyltriethoxysilane, trade name, manufactured by Shin-Etsu Chemical Co., Ltd.) over 60 minutes from a dropping funnel to 70 parts by mass of ion-exchanged water (a solvent temperature: 25° C.) as a solvent and performing the reaction for 24 hours at 25° C. under nitrogen atmosphere was used.

In Example 26, ethylene oxide adduct of bisphenol A (BPAEO adduct) ("NEWPOL BPE-60" manufactured by Sanyo Chemical Industries, Ltd.) was added as the plasticizer.

Note that, in Table 2 and Table3, the amount of the soluble metal compound (A) and aluminum nitrate as the aluminum compound is expressed in % by mass in each metal element conversion, based on the electrodeposition coating composition.

In addition, the zinc oxide and zinc phosphate were used in the form microdispersed for the electrodeposition coating composition. The concentration in metal element conversion (% by mass) of the soluble metal compound (A), based on the electrodeposition coating composition, was calculated by measuring the concentration in the supernatant liquid with a X-ray fluorescence spectrometer fluorescent X-ray spectroscopy ("ZSX Primus" manufactured by Rigaku Corporation) after centrifuging the electrodeposition coating composition at 12,000 rpm for 30 minutes with a centrifugal separator ("H-200N": manufactured by Kokusan Co., Ltd.).

In Examples 1 to 14, 16 to 27 and Comparative Examples 1 to 8, the cold-rolled steel sheet (JIS G3141, SPCC-SD) was degreased by immersing the cold-rolled steel sheet in "Surf Cleaner EC90" (manufactured by Nippon Paint Co., Ltd.) for 2 minutes at 50° C. Then, the zirconium-based chemical conversion treatment thereof is performed by immersing the cold-rolled steel sheet in the zirconium-based chemical conversion treatment solution containing 0.005% of ZrF, of which the pH was adjusted to 4 using NaOH, for 90 seconds at 40° C. Then, the necessary amount of 2-ethylhexyl glycol was added to the electrodeposition coating compositions obtained in Examples and Comparative Examples such that the thickness of the electrodeposition coating film after curing is 15 μm, and the steel sheet was immersed therein to precipitate an uncured electrodeposition coating film on the article to be coated (the steel sheet) by applying a voltage thereto under the condition of increasing the voltage to 180V over 30 seconds and maintaining the voltage for 150 seconds.

In Example 15, the cold-rolled steel sheet (JIS G3141, SPCC-SD) was degreased by immersing the cold-rolled steel sheet in "Surf Cleaner EC90" (manufactured by Nippon Paint Co., Ltd.) for 2 minutes at 50° C. Then, using the electrodeposition coating compositions obtained in Examples and Comparative Examples, the electrodeposition coating was performed as described in Example 1.

In Example 28, the cold-rolled steel sheet (JIS G3141, SPCC-SD) was degreased by immersing the cold-rolled steel sheet in "Surf Cleaner EC90" (manufactured by Nippon Paint Co., Ltd.) for 2 minutes at 50° C., was surface conditioned with Surf fine GL-1 (Nippon Paint Co., Ltd.), and then the zinc phosphate-based chemical conversion treatment was performed thereon by immersing it in Surf dynes SD-5000 (Nippon Paint Co., Ltd.), which is a zinc phosphate-based chemical conversion treatment liquid for 2 minutes at 40° C. Then, using the electrodeposition coating compositions obtained in Examples and Comparative Examples, the electrodeposition coating was performed as described in Example 1.

Then, the uncured electrodeposition coating film as obtained above was cured by baking it for 15 minutes at 160° C. to obtain an electrodeposition coated plate having a cured electrodeposition coating film.

The "MEQA" shown in Tables 2 and 3 means milligrams (mg) equivalents of the acid (MEQ(A)), based on 100 g od the resin solid content of the electrodeposition coating composition. The "MEQA" was determined by the potentiometric titration with 1/10N NaOH solution, after about 10 g of the electrodeposition coating composition precisely weighed is dissolved in about 50 ml of solvent (THF).

The "Residual hydroxyl value" shown in Tables 2 and 3 means the theoretical value of the hydroxyl value (theoretical residual hydroxyl value) derived from the amine-modified resin (B) remaining in the electrodeposition coating film after the reaction of the amine-modified resin (B) with the blocked isocyanate curing agent, when cured by heating the electrodeposition coating film formed by electrodeposition coating. The theoretical residual hydroxyl value (TH) was determined by the following formula:

$$TH = \frac{(HB + AB)(MB)}{(MB + MC)} - \frac{IC(MC)}{(MB + MC)}$$

HB: Hydroxyl value of the amine-modified resin (B) [mgKOH/g]
AB: Primary amine value of the amine-modified resin (B) [mgKOH/g]
IC: Isocyanate value of the curing agent (C) [mgKOH/g]
MB: Mass of the amine-modified resin (B)
MC: Mass of the curing agent (C).

The "Ratio of residual hydroxyl group (R)" shown in Tables 2 and 3 means the ratio obtained by using the above formula.

With respect to the electrodeposition coating compositions obtained in Examples and Comparative Examples, the following evaluation tests were conducted.

Edge Corrosion Test

For the edge corrosion test, without using the cold-rolled steel sheet, a L-type cutter spare blade ("LB10K" manufactured by Olfa Corporation) after a pretreatment was used. In the pretreatment, the cutter spare blade was degreased by immersing it in "Surf Cleaner EC90" (manufactured by Nippon Paint Co., Ltd.) for 2 minutes at 50° C., was surface conditioned with Surf fine GL-1 (Nippon Paint Co., Ltd.), and then the zinc phosphate-based chemical conversion treatment was performed thereon by immersing it in Surf dynes SD-5000 (Nippon Paint Co., Ltd.), which is a zinc phosphate-based chemical conversion treatment liquid for 2 minutes at 40° C. The cured electrodeposition coating film was formed on the pretreated cutter spare blade by electrodeposition coating with the electrodeposition coating compositions of Examples 1 to 14, 16 to 28 and Comparative Examples 1 to 8 under the same conditions as that of the electrodeposition coating. The edge corrosion was evaluated by measuring the number of the rust in the tip portion of the L-type cutter spare blade after the salt spray test for 168 hours at 35° C. was conducted. In Example 15, a L-type cutter spare blade ("LB10K" manufactured by Olfa Corporation), which was degreased by immersing it in "Surf Cleaner EC90" (manufactured by Nippon Paint Co., Ltd.) for 2 minutes at 50° C. and the zinc phosphate-based chemical conversion treatment was not performed, was used, and then the cured electrodeposition coating film was formed thereon by electrodeposition coating with the electrodeposition coating composition of Examples 15. The edge corrosion was evaluated as described above. The evaluation criteria are as follows.

(Evaluation Criteria)
ooo: Less than 5
oo: Not less than 5 and less than 10
o: Not less than 10 and less than 20
oΔ: Not less than 20 and less than 50
Δ: Not less than 50 and less than 100
x: Not less than 100

Cyclic Corrosion Test (CCT)

A cross-cut scratch deep enough to reach the substrate was put with a knife on the coating film of the electrodeposition coated plate after curing, which was formed by using a cold-rolled steel sheet. The cyclic corrosion test as the corrosion resistance in line with the actual corrosive environment was evaluated by observing rust and blistering from the cross-cut portion, after conducting 100 cycles according to JASO M609-91 "Automotive Material Corrosion Test Method". The evaluation criteria are as follows.

(Evaluation Criteria)

oo: The maximum width of the rust or blistering from the cut portion is less than 5 mm (both sides).

o: The maximum width of the rust or blistering from the cut portion is within the range of not less than 5 mm and less than 7.5 mm (both sides) and there is no blistering other than the cut portion.

oΔ: The maximum width of the rust or blistering from the cut portion is within the range of not less than 5 mm and less than 7.5 mm (both sides) and there are also blisterings other than the cut portion.

Δ: The maximum width of the rust or blistering from the cut portion is within the range of not less than 7.5 mm and less than 10 mm (both sides).

Δx: The maximum width of the rust or blistering from the cut portion is within the range of not less than 10 mm and less than 12.5 mm (both sides).

x: The maximum width of the rust or blistering from the cut portion is within the range of not less than 12.5 mm (both sides).

Physical Properties of Cured Electrodeposition Coating Film (Coating Film Physical Properties)

The hundred square shaped cuts (2 mm×2 mm) surrounded by four cut lines were put on the electrodeposition coated plate having the cured electrodeposition coating film obtained from Examples and Comparative Examples by putting 11 parallel cut lines deep enough to reach the substrate at 2 mm intervals on the coating film using a small cutter knife vertical to the coating film and putting 11 parallel cut lines at 2 mm intervals perpendicular to the above parallel cut lines previously formed on the coating film in the same manner thereas. The test piece was then immersed in ion exchange water of 50° C. for 480 hours. The water on the test piece was wiped off after immersing, and then an adhesive tape ("El Pack LP-24" manufactured by NICHIBAN Co., Ltd.; width 24 mm) was pressed on the cut portion of the test coating film without including the bubbles. The physical properties of the cured electrodeposition coating film were evaluated by rapidly peeling off the adhesive tape, based on the presence or absence of the square of the coating film peeled off, according to the following evaluation criteria.

(Evaluation Criteria)

o: There is no square of the coating film peeled off.

x: There is a square of the coating film peeled off.

Appearance of Cured Electrodeposition Coating Film (Coating Film Appearance)

With respect to the electrodeposition coated plate having the cured electrodeposition coating film obtained from Examples and Comparative Examples, the coating appearance was evaluated by checking whether there is an abnormality in the appearance of the coating film by visual observation according to the following evaluation criteria.

(Evaluation Criteria)

oo: The coating film has a very uniform appearance.

o: The coating film has a uniform appearance.

oΔ: It is visible that there is slightly unevenness in some parts, but the coating film has a substantially uniform appearance as a whole.

Δ: The coating film has the appearance such that there is unevenness.

x: The coating film has the appearance that is not clearly uniform.

Stability of Electrodeposition Coating Composition (Stability)

The stability is evaluated by checking the state of the electrodeposition coating composition by visual observation in the state of standing or stirring the electrodeposition coating composition. The "stable" herein means that the sedimentation of the pigment is not caused within 15 minutes after stopping the stirring. The evaluation criteria are as follows.

(Evaluation Criteria)

o: It is stable in the state of standing the electrodeposition coating composition.

oΔ: It is not stable in the state of standing the electrodeposition coating composition, but it is immediately stable by stirring the electrodeposition coating composition again.

Δ: It is stable in the state of continuously stirring the electrodeposition coating composition.

x: It is not stable even in the state of continuously stirring the electrodeposition coating composition.

TABLE 2

| | | Examples | | | | | | |
|---|---|---|---|---|---|---|---|---|
| | | 1 | 2 | 3 | 4 | 5 | 6 | 7 |
| Pretreatment for coating an article to be coated | | Zr-crt* | Zr-crt* | Zr-crt* | Zr-crt* | Zr-crt* | Zr-crt* | Zr-crt* |
| Electrodeposition coating composition | | | | | | | | |
| Soluble metal compound (A) (% by mass) | Fluorotitanic acid | | | | | | | |
| | Bismuth lactate | | | | | | | |
| | Zn(ZnO) | 0.02 | 0.02 | 0.02 | 0.02 | 0.02 | 0.02 | 0.02 |
| | Zinc phosphate microparticle | | | | | | | |
| | Yttrium nitrate | | | | | | | |
| | Fluorozirconic acid | 0.03 | 0.03 | 0.03 | 0.03 | 0.03 | 0.03 | 0.03 |

TABLE 2-continued

| | | | | | | | | |
|---|---|---|---|---|---|---|---|---|
| Resin solid content (% by mass) | Resin Emulsion (Em A) | 10 | | | | | | |
| | (Em B) | | 10 | | | | | |
| | (Em C) | | | 10 | | | | |
| | (Em D) | | | | 10 | | | |
| | (Em E) | | | | | 10 | | |
| | (Em F) | | | | | | 10 | |
| | (Em G) | | | | | | | 10 |
| | (Em H) | | | | | | | |
| Nitric acid (D) (% by mass) | Free nitric acid | | | | | | | |
| | Calcium nitrite | | | | | | | |
| Chelating acid (E) | Lactic acid | | | | | | | |
| | Methanesulfonic acid | | | | | | | |
| | DMPA | | | | | | | |
| | pH | 6 | 6 | 6 | 6 | 5.5 | 5.5 | 5.5 |
| Other components | Aminosilane compound (F) | | | | | | | |
| | Pigment | 1 | 1 | 1 | 1 | 1 | 1 | 1 |
| | Aluminum nitrate (G) | | | | | | | |
| | BPAEO adduct | | | | | | | |
| | MEQA | 40 | 40 | 40 | 40 | 50 | 50 | 50 |
| | Residual hydroxyl value | 150 | 160 | 130 | 45 | 160 | 110 | 150 |
| | Ratio of residual hydroxyl group (R) | 30000 | 32000 | 26000 | 9000 | 32000 | 22000 | 30000 |
| Performance evaluation | | | | | | | | |
| Edge corrosion | | ○ | ○ | ○ | ○Δ | ○ | ○ | ○○ |
| CCT | | ○ | ○○ | ○ | ○Δ | ○○ | ○ | ○○ |
| Coating film physical properties | | ○ | ○ | ○ | ○ | ○ | ○ | ○ |
| Coating film appearance | | ○ | ○Δ | ○○ | ○ | ○ | ○○ | ○○ |
| Stability | | ○ | ○ | ○ | ○ | ○ | ○ | ○ |

| | | Examples | | | | | | |
|---|---|---|---|---|---|---|---|---|
| | | 8 | 9 | 10 | 11 | 12 | 13 | 14 |
| Pretreatment for coating an article to be coated | | Zr-crt* | Zr-crt* | Zr-crt* | Zr-crt* | Zr-crt* | Zr-crt* | Zr-crt* |
| Electrodeposition coating composition | | | | | | | | |
| Soluble metal compound (A) (% by mass) | Fluorotitanic acid | | 0.03 | | | | | |
| | Bismuth lactate | | | | 0.05 | | | |
| | Zn(ZnO) | 0.02 | 0.02 | | | | 0.05 | 0.02 |
| | Zinc phosphate microparticle | | | 0.5 | | | | |
| | Yttrium nitrate | | | | | 0.05 | | |
| | Fluorozirconic acid | 0.03 | | | | | | 0.03 |
| Resin solid content (% by mass) | Resin Emulsion (Em A) | | 10 | 10 | 10 | 10 | 10 | 10 |
| | (Em B) | | | | | | | |
| | (Em C) | | | | | | | |
| | (Em D) | | | | | | | |
| | (Em E) | | | | | | | |
| | (Em F) | | | | | | | |
| | (Em G) | | | | | | | |
| | (Em H) | 10 | | | | | | |
| Nitric acid (D) (% by mass) | Free nitric acid | | | | | | | 0.2 |
| | Calcium nitrite | | | | | | | |
| Chelating acid (E) | Lactic acid | | | | | | | |
| | Methanesulfonic acid | | | | | | | |
| | DMPA | | | | | | | |
| | pH | 5.5 | 6 | 6 | 6 | 6 | 6 | 4 |
| Other components | Aminosilane compound (F) | | | 0.04 | | | | |
| | Pigment | 1 | 1 | 1 | 1 | 1 | 1 | 1 |
| | Aluminum nitrate (G) | | | | | | | |
| | BPAEO adduct | | | | | | | |
| | MEQA | 50 | 40 | 40 | 40 | 40 | 40 | 70 |
| | Residual hydroxyl value | 170 | 150 | 150 | 150 | 150 | 150 | 150 |
| | Ratio of residual hydroxyl group (R) | 34000 | 30000 | 30000 | 30000 | 30000 | 30000 | 30000 |
| Performance evaluation | | | | | | | | |
| Edge corrosion | | ○○ | ○Δ | ○○ | ○ | ○○ | ○○ | ○ |
| CCT | | ○○ | ○Δ | ○ | ○ | ○ | ○Δ | ○○ |
| Coating film physical properties | | ○ | ○ | ○ | ○ | ○ | ○ | ○ |
| Coating film appearance | | ○○ | ○ | ○ | ○ | ○ | ○ | ○Δ |
| Stability | | ○ | ○ | ○ | ○ | ○ | ○ | ○ |

TABLE 2-continued

|  |  | Examples | | | | | | |
| --- | --- | --- | --- | --- | --- | --- | --- | --- |
|  |  | 15 | 16 | 17 | 18 | 19 | 20 | 21 |
| Pretreatment for coating an article to be coated |  | Dd* | Zr-crt* | Zr-crt* | Zr-crt* | Zr-crt* | Zr-crt* | Zr-crt* |
|  | Electrodeposition coating composition | | | | | | | |
| Soluble metal compound (A) (% by mass) | Fluorotitanic acid |  |  |  |  |  |  |  |
|  | Bismuth lactate |  |  |  |  |  |  |  |
|  | Zn(ZnO) | 0.02 | 0.02 | 0.02 | 0.22 | 0.002 | 0.02 | 0.02 |
|  | Zinc phosphate microparticle |  |  |  |  |  |  |  |
|  | Yttrium nitrate |  |  |  |  |  |  |  |
|  | Fluorozirconic acid | 0.03 | 0.03 | 0.03 | 0.03 | 0.003 | 0.03 | 0.03 |
| Resin solid content (% by mass) | Resin Emulsion |  |  |  |  |  |  |  |
|  | (Em A) | 10 | 10 | 10 | 10 | 10 | 10 | 10 |
|  | (Em B) |  |  |  |  |  |  |  |
|  | (Em C) |  |  |  |  |  |  |  |
|  | (Em D) |  |  |  |  |  |  |  |
|  | (Em E) |  |  |  |  | 10 |  |  |
|  | (Em F) |  |  |  |  |  |  |  |
|  | (Em G) |  |  |  |  |  |  |  |
|  | (Em H) |  |  |  |  |  |  |  |
| Nitric acid (D) (% by mass) | Free nitric acid | 0.2 |  |  |  |  |  |  |
|  | Calcium nitrite |  | 0.01 | 0.05 | 0.01 | 0.01 |  |  |
| Chelating acid (E) | Lactic acid |  |  |  |  |  | 0.2 |  |
|  | Methanesulfonic acid |  |  |  |  |  |  | 0.15 |
|  | DMPA |  |  |  |  |  |  |  |
|  | pH | 4 | 6 | 6 | 6 | 6 | 4 | 4 |
| Other components | Aminosilane compound (F) |  |  |  |  |  |  |  |
|  | Pigment | 1 | 1 | 1 | 1 | 1 | 1 | 1 |
|  | Aluminum nitrate (G) |  |  |  |  |  |  |  |
|  | BPAEO adduct |  |  |  |  |  |  |  |
|  | MEQA | 70 | 40 | 40 | 40 | 40 | 70 | 70 |
|  | Residual hydroxyl value | 150 | 150 | 150 | 150 | 150 | 150 | 150 |
|  | Ratio of residual hydroxyl group (R) | 30000 | 30000 | 30000 | 4400 | 300000 | 30000 | 30000 |
|  | Performance evaluation | | | | | | | |
| Edge corrosion |  | ○ | ○○○ | ○○○ | ○○○ | ○○○ | ○ | ○ |
| CCT |  | ○Δ | ○○ | ○○ | ○○ | ○○ | ○○ | ○○ |
| Coating film physical properties |  | ○ | ○ | ○ | ○ | ○ | ○ | ○ |
| Coating film appearance |  | ○Δ | ○ | ○Δ | ○Δ | ○ | ○ | ○ |
| Stability |  | ○ | ○ | ○ | ○ | ○ | ○ | ○ |

|  |  | Examples | | | | |
| --- | --- | --- | --- | --- | --- | --- |
|  |  | 22 | 23 | 24 | 25 | 26 |
| Pretreatment for coating an article to be coated |  | Zr-crt* | Zr-crt* | Zr-crt* | Zr-crt* | Zr-crt* |
|  | Electrodeposition coating composition | | | | | |
| Soluble metal compound (A) (% by mass) | Fluorotitanic acid |  |  |  |  |  |
|  | Bismuth lactate |  |  |  |  |  |
|  | Zn(ZnO) | 0.02 | 0.02 | 0.02 | 0.02 | 0.02 |
|  | Zinc phosphate microparticle |  |  |  |  |  |
|  | Yttrium nitrate |  |  |  |  |  |
|  | Fluorozirconic acid | 0.03 | 0.03 | 0.03 | 0.03 | 0.03 |
| Resin solid content (% by mass) | Resin Emulsion |  |  |  |  |  |
|  | (Em A) | 10 | 10 | 10 | 10 | 10 |
|  | (Em B) |  |  |  |  |  |
|  | (Em C) |  |  |  |  |  |
|  | (Em D) |  |  |  |  |  |
|  | (Em E) |  |  |  |  |  |
|  | (Em F) |  |  |  |  |  |
|  | (Em G) |  |  |  |  |  |
|  | (Em H) |  |  |  |  |  |
| Nitric acid (D) (% by mass) | Free nitric acid |  |  |  |  |  |
|  | Calcium nitrite |  |  |  |  |  |
| Chelating acid (E) | Lactic acid |  |  |  |  |  |
|  | Methanesulfonic acid |  |  |  |  |  |
|  | DMPA | 0.2 |  |  |  |  |
|  | pH | 4 | 6 | 6 | 6 |  |

TABLE 2-continued

|  |  |  |  |  |  |  |
|---|---|---|---|---|---|---|
| Other components | Aminosilane compound (F) |  |  | 0.1 |  |  |
|  | Pigment |  | 1 | 1 | 0 | 1 |
|  | Aluminum nitrate (G) |  |  |  |  | 0.02 |
|  | BPAEO adduct |  |  |  |  |  | 0.2 |
|  | MEQA |  | 70 | 40 | 40 | 40 | 40 |
| Residual hydroxyl value |  |  | 150 | 150 | 150 | 150 | 150 |
| Ratio of residual hydroxyl group (R) |  |  | 30000 | 30000 | 30000 | 30000 | 30000 |
| Performance evaluation |||||||

|  |  |  |  |  |  |
|---|---|---|---|---|---|
| Edge corrosion |  | ○ | ○ | ○△ | ○ | ○ |
| CCT |  | ○ | ○○ | ○△ | ○○ | ○○ |
| Coating film physical properties |  | ○ | ○ | ○ | ○ | ○ |
| Coating film appearance |  | ○ | ○ | ○ | ○△ | ○○ |
| Stability |  | ○ | ○ | ○ | ○ | ○ |

TABLE 3

|  |  | Comparative Examples ||||
|---|---|---|---|---|---|
|  |  | 1 | 2 | 3 | 4 |
| Pretreatment for coating an article to be coated |  | Zr-crt* | Zr-crt* | Zr-crt* | Zr-crt* |
| Electrodeposition coating composition |||||||
| Soluble metal compound (A) (% by mass) | Fluorotitanic acid |  |  |  |  |
|  | Zn(ZnO) |  |  |  |  |
|  | Fluorozirconic acid |  | 0.15 | 0.003 |  |
| Resin solid content (% by mass) | Resin Emulsion (Em A) | 10 |  | 10 |  |
|  | (Em D) |  | 10 |  | 10 |
| Nitric acid (D) (% by mass) | Free nitric acid |  |  |  |  |
|  | Calcium nitrite |  |  |  |  |
|  | pH | 6 | 6 | 6 | 6 |
| Curing catalyst | Sn | 0.03 | 0.03 | 0.03 | 0.03 |
| Other components | Pigment | 1 | 1 | 1 | 1 |
|  | Aminosilane compound (F) |  |  |  |  |
|  | MEQA | 30 | 30 | 50 | 25 |
| Residual hydroxyl value |  | 150 | 45 | 150 | 45 |
| Ratio of residual hydroxyl group (R) |  | 3000 | 500000 | — |  |
| Performance evaluation |||||||
| Edge corrosion |  | x | ○ | x | x |
| CCT |  | △x | △x | △ | △x |
| Coating film physical properties |  | ○ | ○ | ○ | ○ |
| Coating film appearance |  | ○ | △ | ○ | ○ |
| Stability |  | ○ | ○ | ○ | ○ |

|  |  | Comparative Examples ||||
|---|---|---|---|---|---|
|  |  | 5 | 6 | 7 | 8 |
| Pretreatment for coating an article to be coated |  | Zr-crt* | Zr-crt* | Zr-crt* | Zr-crt* |
| Electrodeposition coating composition |||||||
| Soluble metal compound (A) (% by mass) | Fluorotitanic acid |  |  |  |  |
|  | Zn(ZnO) | 0.06 | 0.0012 | 0.06 | 0.0012 |
|  | Fluorozirconic acid | 0.09 | 0.0018 | 0.09 | 0.0018 |
| Resin solid content (% by mass) | Resin Emulsion (Em A) |  | 10 |  | 10 |
|  | (Em D) | 10 |  | 10 |  |
| Nitric acid (D) (% by mass) | Free nitric acid |  |  |  |  |
|  | Calcium nitrite |  |  | 0.01 | 0.01 |
|  | pH | 6 | 6 | 6 | 6 |
| Curing catalyst | Sn |  |  |  |  |
| Other components | Pigment | 1 | 1 | 1 | 1 |
|  | Aminosilane compound (F) |  |  |  |  |
|  | MEQA | 30 | 50 | 30 | 50 |
| Residual hydroxyl value |  | 45 | 150 | 45 | 150 |
| Ratio of residual hydroxyl group (R) |  | 3000 | 500000 | 3000 | 500000 |

TABLE 3-continued

| | Performance evaluation | | | |
|---|---|---|---|---|
| Edge corrosion | ○ | x | ○ | Δ |
| CCT | Δx | Δ | Δ | Δx |
| Coating film physical properties | ○ | ○ | ○ | ○ |
| Coating film appearance | Δ | ○ | Δ | ○ |
| Stability | ○ | ○ | ○ | ○ |

Em: Emulsion
Zr-crt*: Zr-based chemical conversion treatment
Dd*: Only degreasing
*: The amount of Sn as the curing catalyst shows the content of dibutyl tin oxide derived from the dispersed paste of Preperation Example 5.
**: The amount of the soluble metal compound (A) and aluminum complex (G) is in metal element conversion.

It is confirmed that the all coated articles obtained by coating the electrodeposition coating composition of Examples have excellent CCT test results and excellent corrosion resistance. The coated articles of Examples also have excellent coating film smoothness (coating film appearance) and the electrodeposition coating composition has excellent stability. Further, it is also shown by these examples that the electrodeposition coating composition of the present invention is suitable for the electrodeposition coating to the article to be coated, on which the chemical conversion treatment is performed treated with a zirconium-based chemical conversion treatment composition.

In addition, when performing the chemical conversion treatment of the type such that the coating film is grown from a crystal nucleus as a base point, such as the zinc phosphate-based chemical conversion treatment, the chemical conversion coating film is difficult to form sufficiently at the edge portion of an article to be coated, and there is a problem that the corrosion easily starts from the portion. However, in Examples 1 to 14 and 16 to 27 using the L-type cutter spare blade, on which the zinc phosphate-based chemical conversion treatment was performed, and Example 15 without any chemical conversion treatment, it was confirmed to have excellent rust resistance because it was very difficult to cause the corrosion at the edge portion.

In Comparative Example 1 using the electrodeposition coating composition without the soluble metal compound (A), the CCT test result was poor and the corrosion resistance was poor.

In Comparative Example 2, 3, 5 and 6, of which the ratio of residual hydroxyl group (R) does not satisfy the range of 4,000<R<400,000, the CCT test results were also poor and the corrosion resistance was also poor. In Comparative Example 3 and 6, the results of the edge corrosion were poor.

In Comparative Example 4, which the electrodeposition coating was performed with the conventional electrodeposition coating composition on the article to be coated that the chemical conversion treatment was performed with the zirconium-based chemical conversion treatment composition, the CCT test result was poor and the corrosion resistance was poor.

In Comparative Examples 7 and 8, which the ratio of residual hydroxyl group (R) does not satisfy the range of 4,000<R<400,000 and calcium nitrite was used, the CCT test results were also poor and the corrosion resistance was also poor. Further, in Comparative Example 8, the result of the edge corrosion was poor.

INDUSTRIAL APPLICABILITY

By using the electrodeposition coating composition of the present invention, a coating film having excellent edge rust resistance can be obtained. Even when using a steel sheet, on which the zirconium-based chemical conversion treatment is performed, there is an advantage that the coating film having excellent corrosion resistance, excellent adhesion and excellent coating film smoothness (coating film appearance) can be obtained. By using the electrodeposition coating composition of the present invention, the steel sheet, on which the zirconium-based chemical conversion treatment is performed, can be effectively utilized, and it is possible to reduce the cost and effort required for treating the sludge due to the zinc phosphate-based chemical conversion treatment.

What is claimed is:

1. An electrodeposition coating composition comprising
a soluble metal compound (A) containing at least one metal selected from the group consisting of Ti, Bi, Zn, Y, Nd, La and Zr,
an amine-modified resin (B), and
a curing agent (C),
wherein the amine-modified resin (B) has a number average molecular weight of 1,000 to 5,000, an amine value of 20 to 100 mgKOH/g and a hydroxyl value of 50 to 400 mgKOH/g,
wherein the curing agent (C) is a blocked isocyanate curing agent,
wherein a theoretical residual hydroxyl value when the amine-modified resin (B) and the blocked isocyanate curing agent are reacted in an electrodeposition coating film during thermal curing is within the range of 20 to 350 mgKOH/g, and
wherein a ratio (R) is greater than 4,000 and smaller than 400,000,
wherein R is represented by the following formula:

$$R = \frac{(TH)}{[(A)/(B+C)]}$$

wherein TH is theoretical residual hydroxyl value [mgKOH/g] and the [(A)/(B+C)] is the concentration in metal element conversion of the soluble metal compound (A) in the electrodeposition coating composition [% by mass], based on the total of a solid concentration [% by mass] of the amine-modified resin (B) and a solid concentration [% by mass] of the blocked isocyanate curing agent in the electrodeposition coating composition,
and
wherein the theoretical residual hydroxyl value is a hydroxyl value derived from the amine-modified resin (B) remaining in the eletrodeposition coating film after the reaction of the amine-modified resin (B) with the blocked isocyanate curing agent, when cured by heating the electrodeposition coating film formed by electrodeposition coating.

2. The electrodeposition coating composition according to claim 1 further comprising nitric acid or a metal salt of nitrous acid (D).

3. The electrodeposition coating composition according to claim 1 further comprising a plasticizer.

4. The electrodeposition coating composition according to claim 1 further comprising at least one chelating acid (E) selected from the group consisting of sulfonic acid, organic phosphonic acid, organic carboxylic acid, amino acid, aminocarboxylic acid, sugar acid and carboxyl group-containing vinyl resin.

5. The electrodeposition coating composition according to claim 1 further comprising an aminosilane compound (F).

6. The electrodeposition coating composition according to claim 1, wherein the soluble metal compound (A) is a zinc compound, and wherein the zinc compound is a zinc phosphate having a volume average particle diameter D50 of not more than 3 μm dispersed with a cationic dispersant and the cationic dispersant is an aminosilane compound.

7. The electrodeposition coating composition according to claim 1 further comprising an aluminum complex (G).

8. The electrodeposition coating composition according to claim 2,
wherein the soluble metal compound (A) has a solid content of 0.001 to 1% by mass in metal element conversion, based on the electrodeposition coating composition,
wherein the nitric acid or the metal salt of nitrous acid (D) has a content of 0.001 to 1% by mass, based on the electrodeposition coating composition, and
wherein the electrodeposition coating composition has a resin solid content of 1 to 30% by mass.

9. A process for forming an electrodeposition coating film on an article to be coated having a Zr-based chemical conversion coating film comprising the steps of:
electrodeposition coating the electrodeposition coating composition according to claim 1 on an article to be coated having a chemical conversion coating film formed by a Zr-based chemical conversion composition to form an electrodeposition coating film, and
thermally curing the electrodeposition coating film to form a cured electrodeposition coating film.

* * * * *